United States Patent
Naruse

(10) Patent No.: US 11,068,690 B2
(45) Date of Patent: Jul. 20, 2021

(54) DETECTION DEVICE, INFORMATION PROCESSING DEVICE, AND INFORMATION PROCESSING METHOD

(71) Applicant: Sony Mobile Communications Inc., Tokyo (JP)

(72) Inventor: Tetsuya Naruse, Kanagawa (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/348,512

(22) PCT Filed: Aug. 10, 2017

(86) PCT No.: PCT/JP2017/029128
§ 371 (c)(1),
(2) Date: May 9, 2019

(87) PCT Pub. No.: WO2018/092368
PCT Pub. Date: May 24, 2018

(65) Prior Publication Data
US 2019/0278970 A1    Sep. 12, 2019

(30) Foreign Application Priority Data

Nov. 16, 2016    (JP) .............................. JP2016-222832

(51) Int. Cl.
*G06K 9/00*    (2006.01)
*G06F 21/32*    (2013.01)
(Continued)

(52) U.S. Cl.
CPC ......... *G06K 9/00026* (2013.01); *G06F 21/32* (2013.01); *G06K 9/0004* (2013.01);
(Continued)

(58) Field of Classification Search
CPC ............. G06K 9/00026; G06K 9/0004; G06K 2009/0006; G06F 21/32; G06T 1/00; G06T 7/00

See application file for complete search history.

(56) References Cited

U.S. PATENT DOCUMENTS

2004/0184641 A1    9/2004    Nagasaka et al.
2006/0078176 A1*   4/2006    Abiko ................ G06K 9/00026
                                                         382/124

(Continued)

FOREIGN PATENT DOCUMENTS

JP    08-279035 A    10/1996
JP    2002-216116 A  8/2002
(Continued)

OTHER PUBLICATIONS

International Search Report and Written Opinion dated Nov. 7, 2017 for PCT/JP2017/029128 filed on Aug. 10, 2017, 12 pages including translation of the International Search Report.

*Primary Examiner* — Stephen G Sherman
(74) *Attorney, Agent, or Firm* — Xsensus LLP

(57) ABSTRACT

[Object] It is desirable that a technology capable of improving the accuracy of biometric authentication through use of image sensors is provided.
[Solution] There is provided a detection device for biometric authentication, including: a first image sensor unit; and a second image sensor unit arranged on a same plane as the first image sensor unit.

13 Claims, 19 Drawing Sheets

(51) Int. Cl.
　　　*G06T 1/00*　　　　(2006.01)
　　　*G06T 7/00*　　　　(2017.01)
(52) U.S. Cl.
　　　CPC ............... *G06T 1/00* (2013.01); *G06T 7/00* (2013.01); *G06K 2009/0006* (2013.01)

(56) References Cited

U.S. PATENT DOCUMENTS

| | | | |
|---|---|---|---|
| 2008/0049987 A1* | 2/2008 | Champagne | G06K 9/00026 382/124 |
| 2008/0142686 A1 | 6/2008 | Konno et al. | |
| 2016/0086011 A1* | 3/2016 | Frye | G01B 9/02 382/124 |
| 2017/0286660 A1* | 10/2017 | Li | G06K 9/00912 |

FOREIGN PATENT DOCUMENTS

| | | |
|---|---|---|
| JP | 2004-178487 A | 6/2004 |
| JP | 2004-265269 A | 9/2004 |
| JP | 2008-153361 A | 7/2008 |
| JP | 2008-181570 A | 8/2008 |
| JP | 2009-98815 A | 5/2009 |
| JP | 2009-276976 A | 11/2009 |
| JP | 2010231336 A | 10/2010 |
| JP | 2012-168768 A | 9/2012 |
| WO | 2011/052323 A1 | 5/2011 |

\* cited by examiner

DETECTION DEVICE, INFORMATION PROCESSING DEVICE, AND INFORMATION PROCESSING METHOD

CROSS-REFERENCE TO RELATED APPLICATIONS

The present application is based on PCT filing PCT/JP2017/029128, filed Aug. 10, 2017, and claims priority to JP 2016-222832, filed Nov. 16, 2016, the entire contents of each are incorporated herein by reference.

TECHNICAL FIELD

The present disclosure relates to a detection device, an information processing device, and an information processing method.

BACKGROUND ART

In recent years, a biometric authentication technology is widely used as a technology for authenticating whether or not a user (hereinafter also simply referred to as a "user under authentication") subjected to authentication agrees with a user (hereinafter also simply referred to as a "registered user") having performed registration beforehand. Such a biometric authentication technology is highly convenient for a user because authentication may be performed even if the user does not remember his/her personal identification number or the like. For example, a biometric authentication technology based on the degree of agreement between an image (hereinafter also referred to as a "registration image") captured and registered in advance and an image (hereinafter also referred to as an "authentication image") captured at the time of authentication is disclosed (for example, see Patent Literature 1).

CITATION LIST

Patent Literature

Patent Literature 1: JP 2012-168768A

DISCLOSURE OF INVENTION

Technical Problem

In a general technology, a single image sensor is utilized as an image sensor that captures a registration image and an authentication image. However, in such a technology, in a case where the shape of a single image sensor is restricted, the flexibility of shape of the image sensor as a whole is low, so that the area of the image sensor as a whole cannot be sufficiently ensured, and the accuracy of biometric authentication is not improved in some cases. Therefore, it is desirable that a technology capable of improving the accuracy of biometric authentication through use of image sensors is provided.

Solution to Problem

According to the present disclosure, there is provided a detection device for biometric authentication, including: a first image sensor unit; and a second image sensor unit arranged on a same plane as the first image sensor unit.

According to the present disclosure, there is provided an information processing device for biometric authentication, including: a registration image generation unit configured to generate a registration image to be compared with an authentication image on the basis of a plurality of first detection images detected by a first image sensor unit and a plurality of second detection images detected by a second image sensor unit arranged on a same plane as the first image sensor unit.

According to the present disclosure, there is provided an information processing method for biometric authentication, including, by a processor: generating a registration image to be compared with an authentication image on the basis of a plurality of first detection images detected by a first image sensor unit and a plurality of second detection images detected by a second image sensor unit arranged on a same plane as the first image sensor unit.

Advantageous Effects of Invention

According to the present disclosure as described above, a technology capable of improving the accuracy of biometric authentication through use of image sensors is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
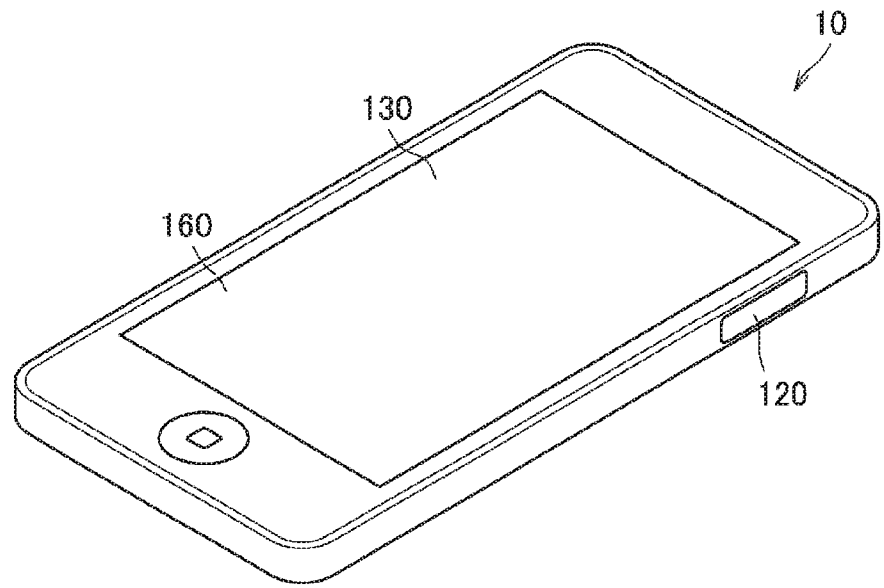
FIG. 1 is a diagram showing an exemplary overview of an information processing device according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and drawings, a plurality of structural elements having substantially the same or similar function and structure are distinguished in some cases by adding different numbers after the same reference numerals. However, in a case where it is not particularly necessary to distinguish between the plurality of structural elements having substantially the same or similar function and structure, the same reference numerals are merely given. In addition, similar structural elements of different embodiments are distinguished in some cases by adding different alphabets after the same reference numerals. However, in a case where it is not particularly necessary to distinguish between similar structural elements, the same reference numerals are merely given.

Note that description will be provided in the following order.

0. Overview
1. Description of first embodiment
1.1. Exemplary functional configuration
1.2. Exemplary configuration of detection device
1.3. Registration processing
1.4. Authentication processing
2. Description of second embodiment
2.1. Exemplary functional configuration
2.2. Exemplar) configuration of detection device
2.3. Registration processing
2.4. Authentication processing
3. Exemplary Hardware configuration
4. Conclusion 0. Overview FIG. 1 is a diagram showing an exemplary overview of an information processing device 10 according to an embodiment of the present disclosure. As shown in FIG. 1, the information processing device 10 includes a manipulation unit 120, an input unit 130, and an output unit 160. In the present specification, a case where the manipulation unit 120 is a power on/off button provided on a side surface of the information processing device 10 as shown in FIG. 1 will be mainly assumed. However, the manipulation unit 120 is not limited to the power on/off button. Details of functions that the manipulation unit 120, the input unit 130, and the output unit 160 respectively have will be described later.

In addition, in the present specification, a case where the information processing device 10 is a smartphone will be mainly assumed. However, the information processing device 10 is not limited to a smartphone. For example, it is sufficient if the information processing device 10 is electronic equipment to which a biometric authentication technology may be applied, and may be a tablet terminal, a mobile phone, a personal computer (PC), an automatic transaction device such as an automated/automatic teller machine (ATM), or another type of electronic equipment.

Here, the background of an embodiment of the present disclosure will be described. In recent years, a biometric authentication technology is widely used as a technology for authenticating whether or not a user under authentication agrees with a registered user. Such a biometric authentication technology is highly convenient for a user because authentication may be performed even if the user does not remember his/her personal identification number or the like. For example, a biometric authentication technology based on the degree of agreement between a registration image captured and registered in advance and an authentication image captured at the time of authentication is disclosed (for example, see JP 2012-168768A).

In a general technology, a single image sensor is utilized as an image sensor that captures a registration image and an authentication image. As an example, a case where a single image sensor is provided on a surface of the manipulation unit 120 of the information processing device 10, and biometric authentication is performed on the basis of the degree of agreement between a registration image and an authentication image captured by the single image sensor is assumed. As shown in FIG. 1, in a case where the information processing device 10 is a thin smartphone, the manipulation unit 120 provided on a side surface of the information processing device 10 will be laterally extended.

Figure 2:
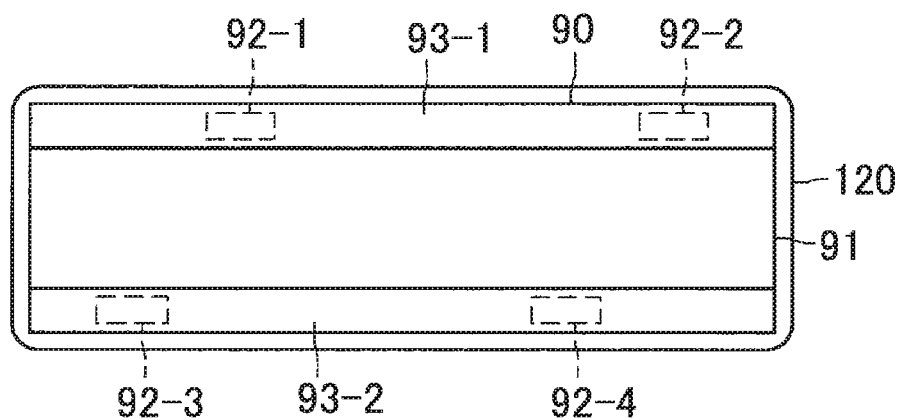
FIG. 2 is a diagram showing exemplary installation of a single image sensor on a surface of a manipulation unit.

FIG. 2 is a diagram showing exemplary installation of a single image sensor on the surface of the manipulation unit 120. Referring to FIG. 2, a single image sensor unit 91 is provided on the surface of the manipulation unit 120. The image sensor unit 91 is included in a detection device 90, and the detection device 90 includes light guide plates 93-1, 93-2 and lightings 92-1 to 92-4 in addition to the image sensor unit 91. The lightings 92-1, 92-2 each emit light, and light emitted by the lightings 92-1, 92-2 is guided into the light guide plate 93-1, and is diffused in the surface of the light guide plate 93-1.

On the other hand, the lightings 92-3, 92-4 each emit light, and light emitted by the lightings 92-3, 92-4 is guided into the light guide plate 93-2, and is diffused in the surface of the light guide plate 93-2. Part of the light diffused in the surface of the light guide plates 93-1 and 93-2 is received by the image sensor unit 91, and is utilized for imaging performed by the image sensor unit 91. In the example shown in FIG. 2, a dedicated image sensor has been manufactured as the image sensor unit 91 such that the image sensor unit 91 also has a laterally extended shape in conformity with the laterally extended shape of the manipulation unit 120.

Figure 3:
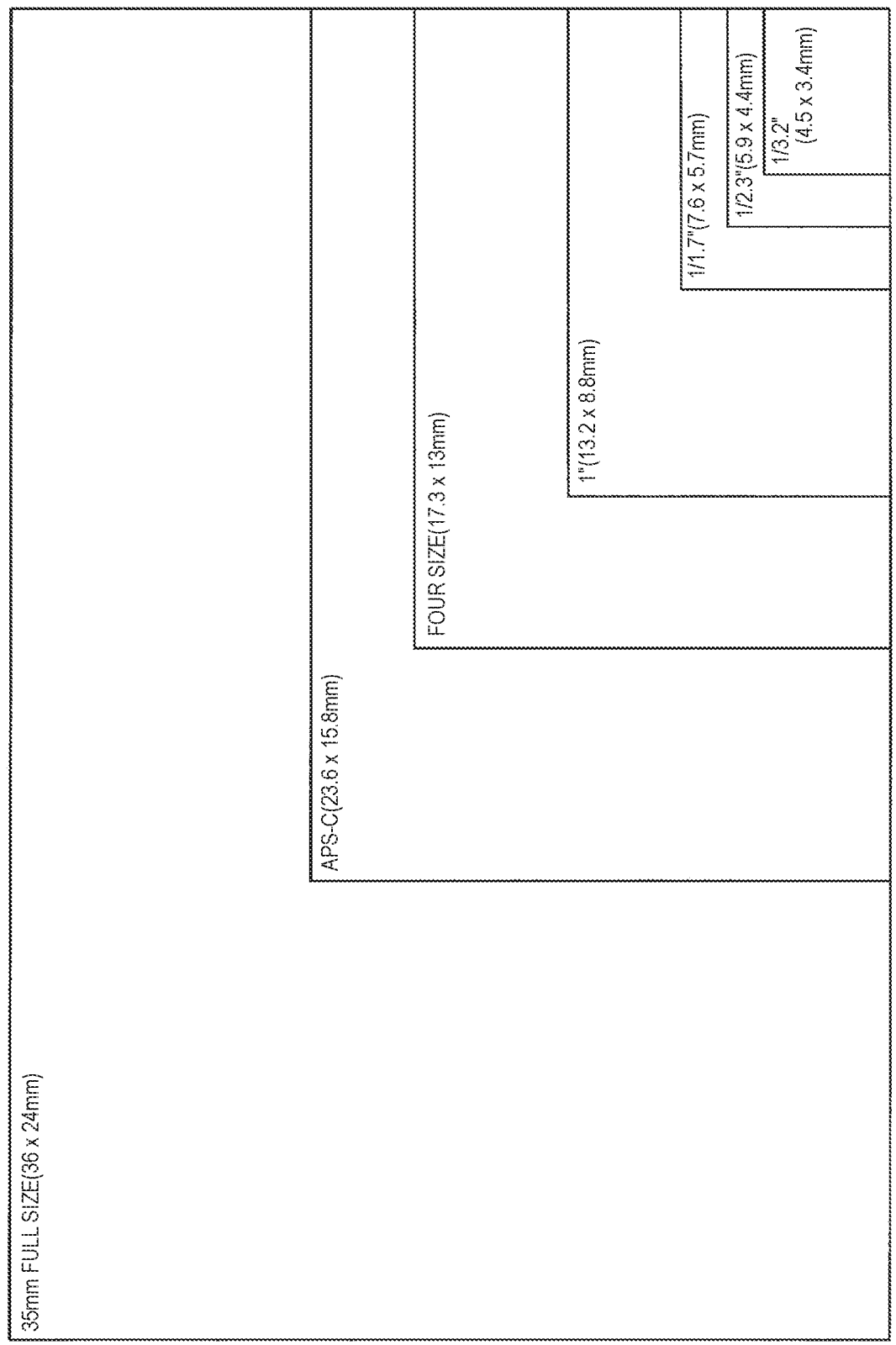
FIG. 3 is a diagram showing an example of various general-purpose image sensors.

However, a dedicated image sensor is not necessarily manufactured as the image sensor unit 91. For example, there may be a case where a general-purpose image sensor is utilized as the image sensor unit 91 for cost reduction. In such a case or the like, the shape of the image sensor unit 91 may be restricted. FIG. 3 is a diagram showing an example of various general-purpose image sensors. As shown in FIG. 3, the aspect ratio of a general-purpose image sensor is generally determined in advance depending on the type. In such a case, the flexibility of shape of the image sensor as a whole is low, so that the area of the image sensor as a whole cannot be sufficiently ensured, and the accuracy of biometric authentication is not improved in some cases.

Therefore, in the present specification, a technology capable of improving the accuracy of biometric authentication through use of an image sensor will be mainly described. Note that, in the following description, an example in which a finger is imaged by an image sensor as an example of a portion of the body will be mainly described. However, the portion of the body imaged by the image sensor is not limited to a finger. For example, the portion of the body imaged by the image sensor may be a portion (for example, an iris or the like) other than a finger.

An overview of an embodiment of the present disclosure has been described above.

1. Description of First Embodiment

Subsequently, a first embodiment of the present disclosure will be described.

[1.1. Exemplary Functional Configuration]

Figure 4:
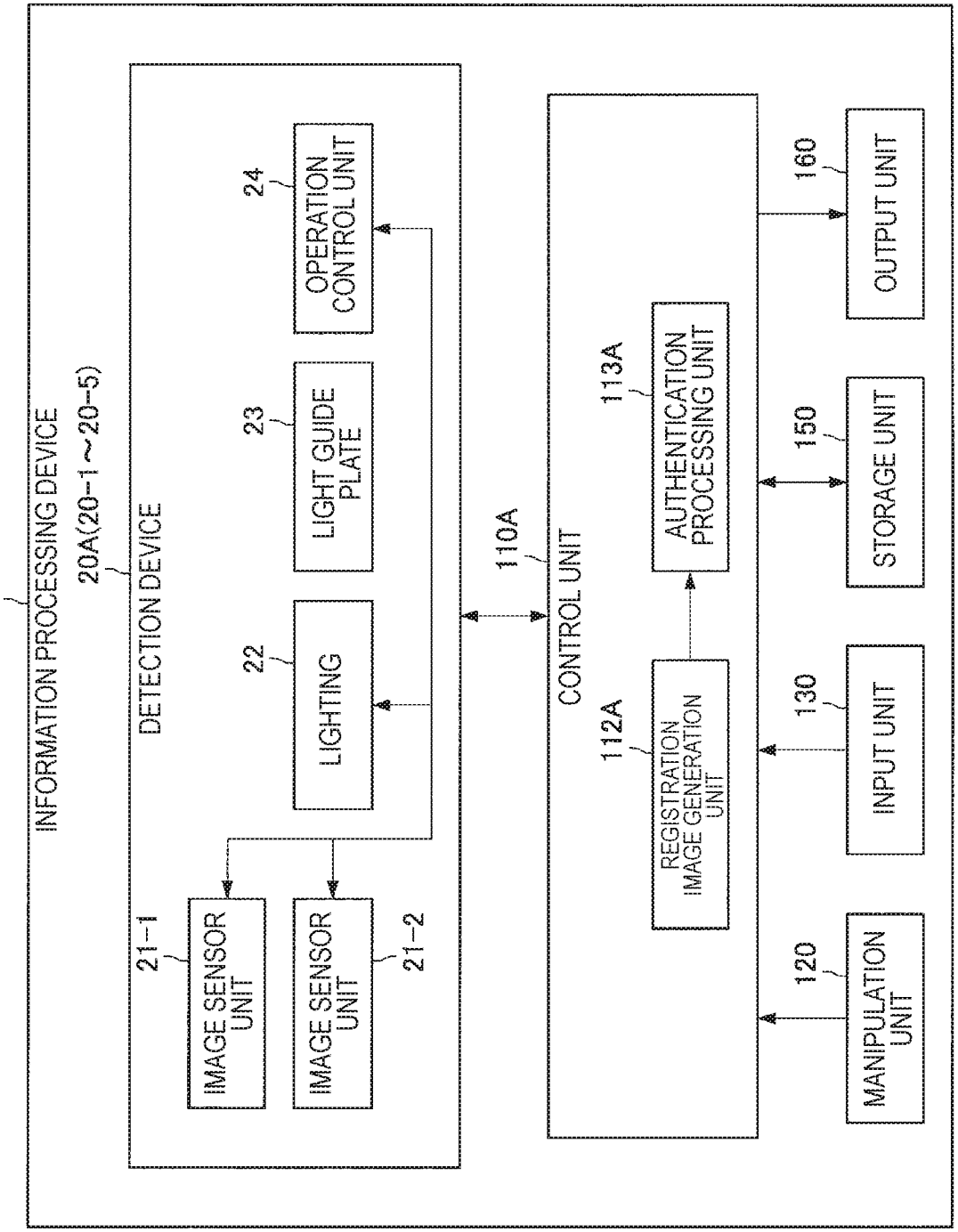
FIG. 4 is a diagram showing an exemplary functional configuration of an information processing device according to a first embodiment of the present disclosure.

First, an exemplary functional configuration of an information processing device according to the first embodiment of the present disclosure will be described. FIG. 4 is a diagram showing an exemplary functional configuration of the information processing device according to the first embodiment of the present disclosure. As shown in FIG. 4, an information processing device 10A according to the first embodiment of the present disclosure has a detection device 20A, a control unit 110A, the manipulation unit 120, the input unit 130, a storage unit 150, and the output unit 160. The manipulation unit 120 has already been described.

Note that, in the present specification, an example in which the detection device 20A, the control unit 110A, the manipulation unit 120, the input unit 130, the storage unit 150, and the output unit 160 exist in the same device (the information processing device 10A) will be mainly described. However, the position at which these blocks exist is not particularly limited. For example, as will be described later, some of these blocks may exist in a server or the like.

The detection device 20A includes an image sensor unit 21-1, an image sensor unit 21-2, lightings 22, light guide plates 23, and an operation control unit 24. In the first embodiment of the present disclosure, the detection device 20A is utilized for biometric authentication.

The image sensor units 21-1, 21-2 receive light emitted by the lightings 22 to capture images. The type of the image sensor unit 21-1 is not limited. For example, the image sensor units 21-1, 21-2 may each be a complementary metal oxide semiconductor (CMOS) or a charge coupled device (CCD). Note that the number of the image sensor units 21 is not limited to two, but it is sufficient if it is plural.

The lightings 22 emit light. Since a case where a fingerprint is imaged by the image sensor units 21-1, 21-2 is assumed in the first embodiment of the present disclosure, a case where light emitted by the lightings 22 is visible light will be mainly assumed. However, the type of light emitted by the lightings 22 is not limited. For example, in a case where a finger vein is imaged by the image sensor units 21-1, 21-2, light emitted by the lightings 22 may be infrared light. The number of the lightings 22 is not particularly limited, but it is sufficient if there is one or more lightings 22. In addition, the lightings 22 may be light emitting diode (LED) lightings.

The light guide plates 23 guide light emitted by the lightings 22 into the inside, and diffuses the light in the surface. Part of the light diffused in the surface of the light guide plates 23 is received by the image sensor units 21-1, 21-2, and is utilized for imaging performed by the image sensor units 21-1, 21-2. The number of the light guide plates 23 is also not particularly limited.

The operation control unit 24 may include, for example, a central processing unit (CPU) or the like. In a case where the operation control unit 24 includes a processing device such as a CPU, such a processing device may include an electronic circuit. Here, the processing device included in the operation control unit 24 may be the same hardware as a processing device included in the control unit 110A, or may be different hardware.

The control unit 110A executes control over each unit of the information processing device 10A. As shown in FIG. 4, the control unit 110A includes a registration image generation unit 112A and an authentication processing unit 113. Details of each of these functional blocks will be described later. Note that the control unit 110A may include a CPU or the like, for example. In a case where the control unit 101A includes a processing device such as a CPU, such a processing device may include an electronic circuit.

The input unit 130 has a sensor, and is capable of acquiring a manipulation input by a user through sensing by the sensor. In the present specification, an example in which the input unit 130 has a touch panel will be mainly described. In such an example, the input unit 130 is capable of acquiring various manipulations that can be detected by the touch panel, such as pressing of a button, selection on an icon or a numeric keypad, a single tap manipulation, a plurality of tap manipulations, sequential selection of a plurality of points, a multi-touch manipulation, a swipe manipulation, a flick manipulation, and a pinch manipulation. However, the input unit 130 is not limited to a touch panel, but may be a keyboard and a mouse, or the like.

The storage unit 150 is a recording medium that stores a program to be executed by the control unit 110A and stores data necessary for execution of the program. In addition, the storage unit 150 temporarily stores data for computation performed by the control unit 110A. The storage unit 150 may be a magnetic storage unit device, a semiconductor storage device, an optical storage device, or a magneto-optical storage device.

The output unit 160 outputs various types of information. In the present specification, a case where the output unit 160 includes a display capable of making a display that is visible to a user will be mainly assumed. The display may be a projector, a liquid crystal display, or an electro-luminescence (EL) display. However, the output unit 160 may include a sound output device. Alternatively, the output unit 160 may include a tactile presentation device that presents a tactile sense to the user.

An exemplary functional configuration of the information processing device 10A according to the first embodiment of the present disclosure has been described above.

[1.2. Exemplary Configuration of Detection Device]

Figure 5:
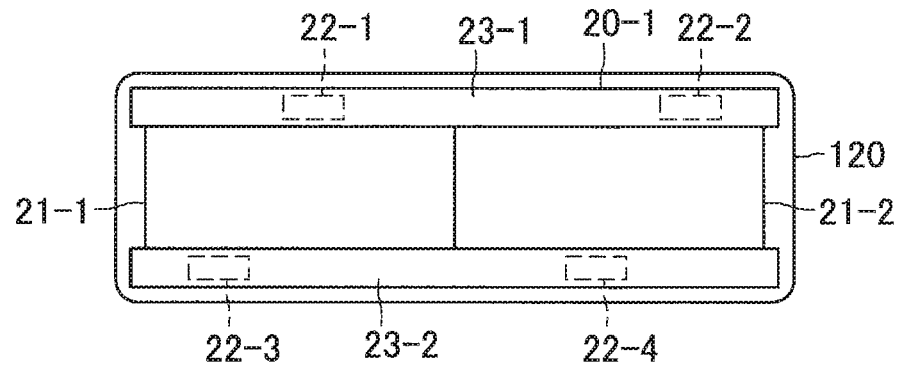
FIG. 5 is a diagram showing an exemplary configuration of a first example of a detection device according to the first embodiment of the present disclosure.

Subsequently, functional details of the information processing device 10A according to the first embodiment of the present disclosure will be described. FIG. 5 is a diagram showing an exemplary configuration of a first example of the detection device 20A according to the first embodiment of the present disclosure. Referring to FIG. 5, a detection device 20-1 as the first example has the image sensor unit (first image sensor unit) 21-1 and the image sensor unit (second image sensor unit) 21-2 as two image sensor units 21. Then, the image sensor unit 21-1 and the image sensor unit 21-2 are arranged on the same plane.

According to such a configuration, even in such a case where the shape of each of the image sensor units 21 is restricted (for example, even in a case where a general-purpose image sensor is utilized as the image sensor unit 21), a reduction of the flexibility of shape of the image sensors as a whole can be suppressed. Consequently, according to such a configuration, it is possible to sufficiently ensure the area of the image sensors as a whole, and to improve the accuracy of biometric authentication. Note that, in the present specification, a case where the detection device 20-1 has two image sensor units 21 is mainly assumed, whilst the detection device 20-1 may have three or more image sensor units 21.

In addition, it is considered that yields of image sensors are even higher in a case where two general-purpose image sensors are utilized than in a case where a single dedicated image sensor is utilized. Consequently, in the case where two general-purpose image sensors are utilized, lower cost may be achieved than in the case where a single dedicated image sensor is utilized.

In addition, referring to FIG. 5, the image sensor unit 21-2 is arranged in the longitudinal direction of the image sensor unit 21-1 relative to the image sensor unit 21-1. According to such a configuration, the image sensor unit 21-1 and the image sensor unit 21-2 are arranged in a laterally extended manner. Consequently, even in a case where image sensors need to be provided in an elongated region (for example, even in such a case where the manipulation unit 120 in which image sensors are provided is elongated as shown in FIG. 5), it is possible to sufficiently ensure the area of the image sensors as a whole, and to improve the accuracy of biometric authentication.

The detection device 20-1 includes light guide plates 23-1, 23-2 and lightings 22-1 to 22-4 in addition to the image sensor units 21-1, 21-2. The lightings 22-1, 22-2 each emit light, and light emitted by the lightings 22-1, 22-2 is guided into the light guide plate 23-1, and is diffused in the surface of the light guide plate 23-1. On the other hand, the lightings 22-3, 22-4 each emit light, and light emitted by the lightings 22-3, 22-4 is guided into the light guide plate 23-2, and is diffused in the surface of the light guide plate 23-2.

Part of the light diffused in the surface of the light guide plates 23-1, 23-2 is received by the image sensor units 21-1, 21-2, and is utilized for imaging performed by the image sensor units 21-1, 21-2.

An exemplary configuration of the first example of the detection device 20A according to the first embodiment of the present disclosure has been described above. In the exemplary configuration of the detection device 20-1 as the first example, there is no lighting provided between the image sensor unit 21-1 and the image sensor unit 21-2. On the other hand, in a second example of the detection device 20A, a lighting is provided between the image sensor unit 21-1 and the image sensor unit 21-2.

Figure 6:
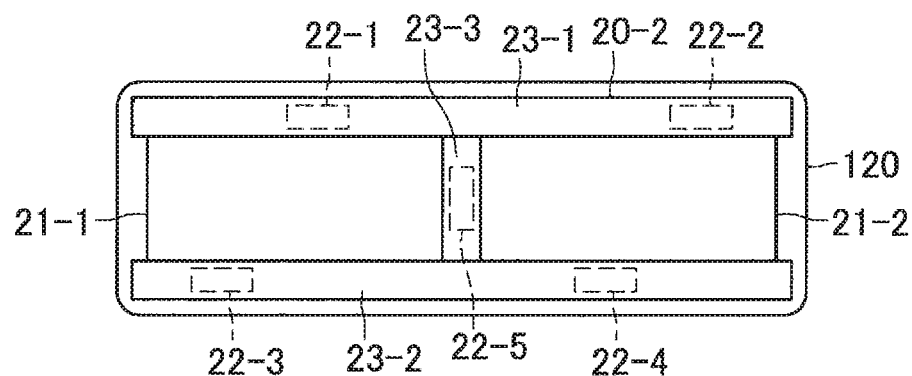
FIG. 6 is a diagram showing an exemplary configuration of a second example of a detection device according to the first embodiment of the present disclosure.

FIG. 6 is a diagram showing an exemplary configuration of the second example of the detection device 20A according to the first embodiment of the present disclosure. Referring to FIG. 6, a detection device 20-2 as the second example is different from the detection device 20-1 as the first example in that the detection device 20-2 has a lighting 22-5 and a light guide plate 23-3 between the image sensor unit 21-1 and the image sensor unit 21-2. The remaining components that the detection device 20-2 has are similar to corresponding components in the detection device 20-1.

The lighting 22-5 emits light, and light emitted by the lighting 22-5 is guided into the light guide plate 23-3, and is diffused in the surface of the light guide plate 23-3. Part of the light diffused in the surface of the light guide plate 23-3 is received by the image sensor units 21-1, 21-2, and is utilized for imaging performed by the image sensor units 21-1, 21-2.

As shown in FIG. 6, the lighting 22-5 is provided between the image sensor unit 21-1 and the image sensor unit 21-2. On the other hand, as shown in FIG. 5 and FIG. 6, the lightings 22-1 to 22-4 are provided around the image sensor unit 21-1 and the image sensor unit 21-2. Consequently, it is considered that the proportion of light that arrives at the image sensor unit 21-1 or the image sensor unit 21-2, of light emitted by the lighting 22-5, is higher than the proportion of light that arrives at the image sensor unit 21-1 or the image sensor unit 21-2, of light emitted by the lightings 22-1 to 22-4.

Further, a case where a finger is brought into contact with the image sensor unit 21-1 and the image sensor unit 21-2 is assumed. In such a case, since the lighting 22-5 is provided between the image sensor unit 21-1 and the image sensor unit 21-2, and the lightings 22-1 to 22-4 are provided around the image sensor unit 21-1 and the image sensor unit 21-2, it is considered that the proportion of light that leaks out from between the image sensor unit 21-1 or the image sensor unit 21-2 and the finger, of light emitted by the lighting 22-5, is lower than the proportion of light that leaks out from between the image sensor unit 21-1 or the image sensor unit 21-2 and the finger, of light emitted by the lightings 22-1 to 22-4.

From the foregoing, it is considered that light emitted from the lighting 22-5 provided between the image sensor unit 21-1 and the image sensor unit 21-2 is utilized more efficiently for imaging performed by the image sensor unit 21-1 and the image sensor unit 21-2 than light emitted from the lightings 22-1 to 22-4 provided around the image sensor unit 21-1 and the image sensor unit 21-2.

Further, when the image sensor unit 21-1 and the image sensor unit 21-2 are in contact with the lighting 22-5, a situation where the amount of light from the lighting 22-5 that is received by the image sensor unit 21-1 and the image sensor unit 21-2 is saturated may occur. Consequently, in order to eliminate such a situation, it is preferable that the lighting 22-5 provided between the image sensor unit 21-1 and the image sensor unit 21-2 is provided away from the image sensor unit 21-1 and away from the image sensor unit 21-2, as shown in FIG. 7.

Figure 7:
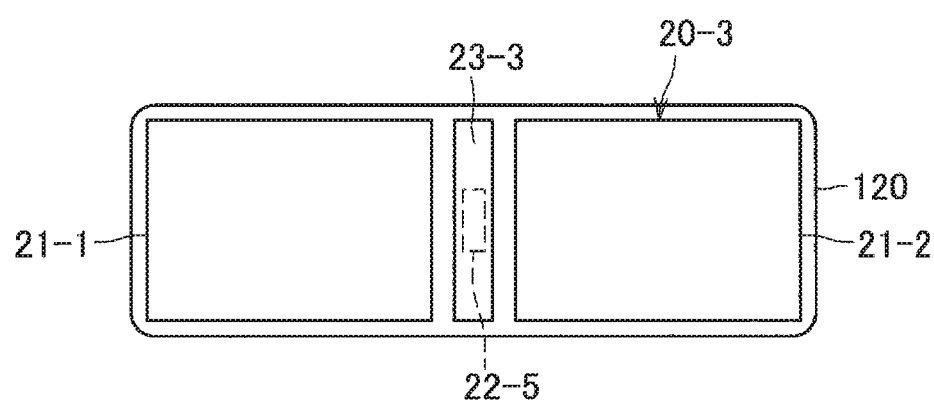
FIG. 7 is a diagram showing an exemplary configuration of a third example of a detection device according to the first embodiment of the present disclosure.

FIG. 7 is a diagram showing an exemplary configuration of a third example of the detection device 20A according to the first embodiment of the present disclosure. Referring to FIG. 7, a detection device 20-3 as the third example is similar to the detection device 20-2 as the second example in that the detection device 20-3 has the lighting 22-5 and the light guide plate 23-3 between the image sensor unit 21-1 and the image sensor unit 21-2, and is different from the detection device 20-2 as the second example in that the detection device 20-3 does not include the light guide plates 23-1, 23-2 and the lightings 22-1 to 22-4.

Features of the lighting 22-5 and the light guide plate 23-3 that the detection device 20-3 as the third example includes are similar to features of the lighting 22-5 and the light guide plate 23-3 that the detection device 20-2 as the second example includes.

Figure 8:
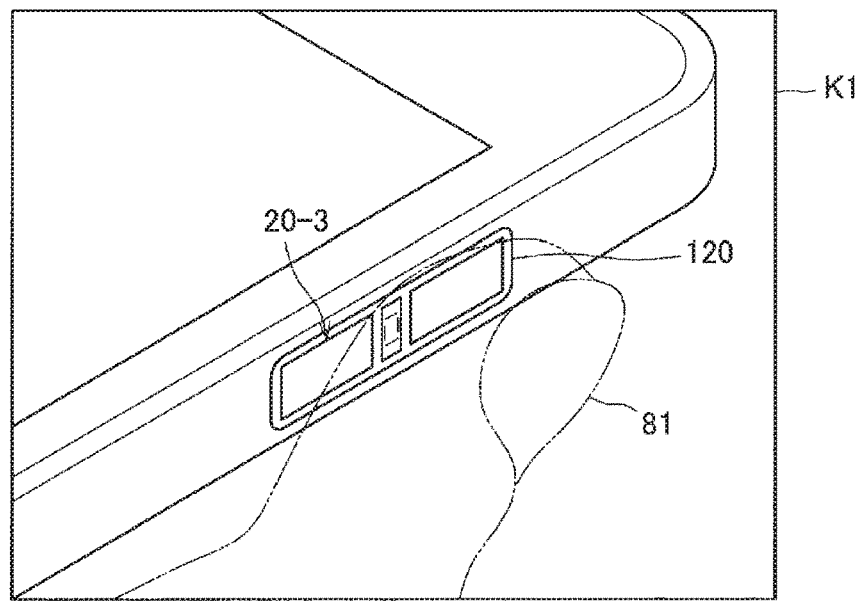
FIG. 8 is a diagram showing a utilization image of a third example of a detection device according to the first embodiment of the present disclosure.

FIG. 8 is a diagram showing a utilization image of the third example of the detection device 20A according to the first embodiment of the present disclosure. An enlarged view K1 is a diagram representing the detection device 20-3 provided on the surface of the manipulation unit 120 and a portion surrounding the detection device 20-3 in an enlarged manner, and at the time of authentication, the finger 82 of a user under authentication is brought into contact with the detection device 20-3. Note that a utilization image of the detection device 20-3 is shown here representatively, whilst utilization images of the detection device 20-1 and the detection device 20-2 are also similar to the utilization image of the detection device 20-3.

In the examples shown above, a case where the image sensor units 21 and the lightings 22 are operated at all the times is mainly assumed. However, the image sensor units 21 and the lightings 22 may not be operated at all the times. For example, control may be exerted such that the image sensor units 21 and the lightings 22 are operated at predetermined timings. Hereinafter, exemplary control over the timing when the image sensor units 21 and the lightings 22 are operated will be described.

Figure 9:
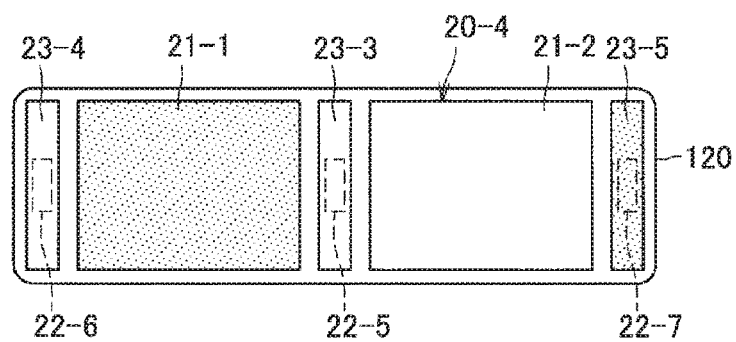
FIG. 9 is a diagram showing an exemplary configuration of a fourth example of a detection device according to the first embodiment of the present disclosure.
Figure 10:
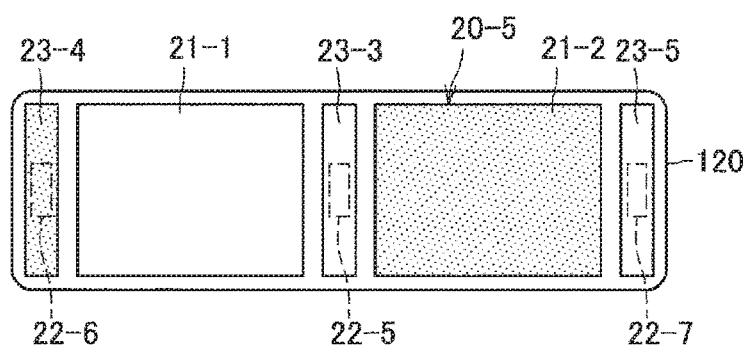
FIG. 10 is a diagram showing an exemplary configuration of a fourth example of a detection device according to the first embodiment of the present disclosure.

FIG. 9 and FIG. 10 are diagrams showing an exemplary configuration of a fourth example of the detection device 20A according to the first embodiment of the present disclosure. Referring to FIG. 9 and FIG. 10, detection devices 20-4 and 20-5 as the fourth example each have the lighting 22-5 and the light guide plate 23-3 between the image sensor unit 21-1 and the image sensor unit 21-2.

In addition, the detection devices 20-4 and 20-5 each have a lighting (first lighting) 22-7 and a light guide plate 23-5 whose distance from the image sensor unit 21-2 is shorter than a distance from the image sensor unit 21-1. In addition, the detection devices 20-4 and 20-5 each have a lighting (second lighting) 22-6 and a light guide plate 23-4 whose distance from the image sensor unit 21-1 is shorter than a distance from the image sensor unit 21-2.

In FIG. 9 and FIG. 10, structural elements being operated have been colored. Specifically, the operation control unit 24 may exert control such that the image sensor unit 21-1 is operated at a certain timing (in the detection device 20-4 shown in FIG. 9), and such that the image sensor unit 21-2 is operated at another timing (in the detection device 20-5 shown in FIG. 10).

In this manner, the operation control unit 24 can achieve a reduction of consumption power by operating the image sensor unit 21-1 and the image sensor unit 21-2 one at a time. Note that it is sufficient if the image sensor unit 21-1 and the image sensor unit 21-2 are operated alternately, whilst the length of time during which each of them is operated is not limited. For example, the image sensor unit 21-1 and the image sensor unit 21-2 may be operated alternately for the same time, or one may be operated for a longer time than the other.

Further, the operation control unit 24 may cause the operation of the lighting 22-7 and the lighting 22-6 to be in conjunction with the image sensor unit 21-1 and the image sensor unit 21-2. That is, the operation control unit 24 may turn on the lighting 22-7 and turn off the lighting 22-6 while the image sensor unit 21-1 is being operated (FIG. 9). In addition, the operation control unit 24 may turn on the lighting 22-6 and turn off the lighting 22-7 while the image sensor unit 21-2 is being operated (FIG. 10).

In this manner, the operation control unit 24 can appropriately keep the amount of light that the image sensor unit 21-1 receives from the lighting 22-6 and the lighting 22-7 by turning on the lighting 22-7 whose distance from the image sensor unit 21-1 is longer and turning off the closer lighting 22-6 while the image sensor unit 21-1 is being operated. Similarly, the operation control unit 24 can appropriately keep the amount of light that the image sensor unit 21-2 receives from the lighting 22-6 and the lighting 22-7 by turning on the lighting 22-6 whose distance from the image sensor unit 21-2 is longer and turning off the closer lighting 22-7 while the image sensor unit 21-2 is being operated.

[1.3. Registration Processing]

Respective exemplary configurations of the first example to the fourth example of the detection device 20A according to the first embodiment of the present disclosure have been mainly described above. When registering an image, registration of an image to be utilized for biometric authentication is performed utilizing a plurality of images detected by the detection device 20A having such a configuration. The timing when image registration is performed is not limited. As an example, in a case where a predetermined registration manipulation (for example, a manipulation of pressing down a registration start button or the like) by a user (registered user) is performed, image registration may be performed. Hereinafter, an example of image registration will be described.

Figure 11:
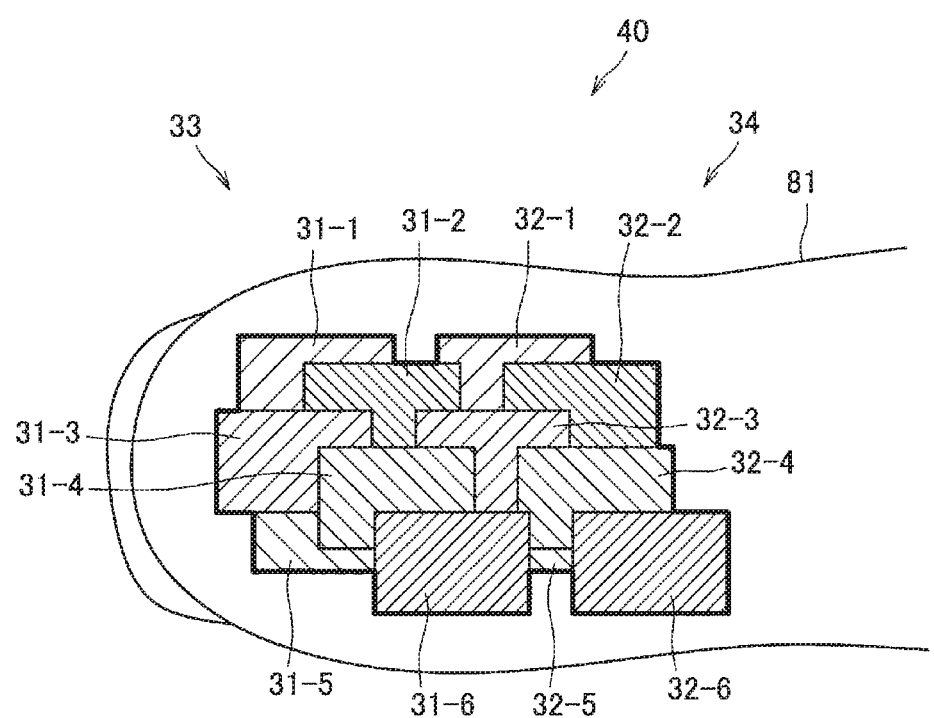
FIG. 11 is a diagram for describing an overview of generation of a registration image.

FIG. 11 is a diagram for describing an overview of generation of a registration image. First, when a predetermined registration manipulation is performed by the registered user, a plurality of first detection images is detected by the image sensor unit 21-1, and a plurality of second detection images is detected by the image sensor unit 21-2.

Referring to FIG. 11, an example in which first detection images 31-1 to 31-6 are detected by the image sensor unit 21-1 as the plurality of first detection images, and second detection images 32-1 to 32-6 are detected by the image sensor unit 21-2 as the plurality of second detection images is shown. However, the number of each of the first detection images and the second detection images is not limited to six, but it is sufficient if the number is plural. Note that, in FIG.

11, the first detection images 31-1 to 31-6 and the second detection images 32-1 to 32-6 are respectively shown at corresponding positions on a finger 81).

Specifically, when a display that prompts to bring the finger into contact with the image sensors is made by the output unit 160, the registered user looking at the display brings the finger into contact with the image sensor unit 21-1 and the image sensor unit 21-2. Subsequently, the first detection image 31-1 is detected by the image sensor unit 21-1, and the second detection image 32-1 is detected by the image sensor unit 21-2. At this time, the timings when detecting the first detection image 31-1 and the second detection image 32-1 may be shifted slightly.

Subsequently, when a display that prompts to change a portion of the finger to be brought into contact with the image sensors is made by the output unit 160, the registered user looking at the display changes the portion of the finger to be brought into contact with the image sensor unit 21-1 and the image sensor unit 21-2. Subsequently, the first detection image 31-2 is detected by the image sensor unit 21-1, and the second detection image 32-2 is detected by the image sensor unit 21-2. At this time, the timings when detecting the first detection image 31-2 and the second detection image 32-2 may be shifted slightly.

Thereafter, the first detection images 31-3 to 31-6 and the second detection images 32-3 to 32-6 are detected similarly to detection of the first detection image 31-2 and the second detection image 32-2. The registration image generation unit 112A generates a registration image 40 to be compared with the authentication image on the basis of the first detection images 31-1 to 31-6 and the second detection images 32-1 to 32-6 having been detected in this manner. According to such a configuration, the respective detection images of each of the image sensor unit 21-1 and the image sensor unit 21-2 are integrated to generate the registration image 40.

FIG. 11 shows a first composite image 33 based on the first detection images 31-1 to 31-6, and shows a second composite image 34 based on the second detection images 32-1 to 32-6. The first composite image 33 and the second composite image 34 will be described later. Note that, in the following description, a timing when the first detection image 31-1 is detected and a timing when the second detection image 32-1 is detected will also be referred to as "corresponding timings" (the same also applies to timings when the other respective pairs such as the first detection image 31-2 and the second detection image 32-2, . . . , the first detection image 31-6 and the second detection image 32-6 are detected).

Here, some techniques are assumed as a technique for generating the registration image 40. First, a first example of generation of the registration image 40 will be described. Specifically, the first example of generation of the registration image 40 corresponds to exemplary generation of the registration image 40 in a case where, since the positional relationship between two images detected by the image sensor unit 21-1 and the image sensor unit 21-2 at corresponding timings has not been stored in advance by the storage unit 150, this positional relationship is not grasped in advance by the registration image generation unit 112A.

Figure 12:
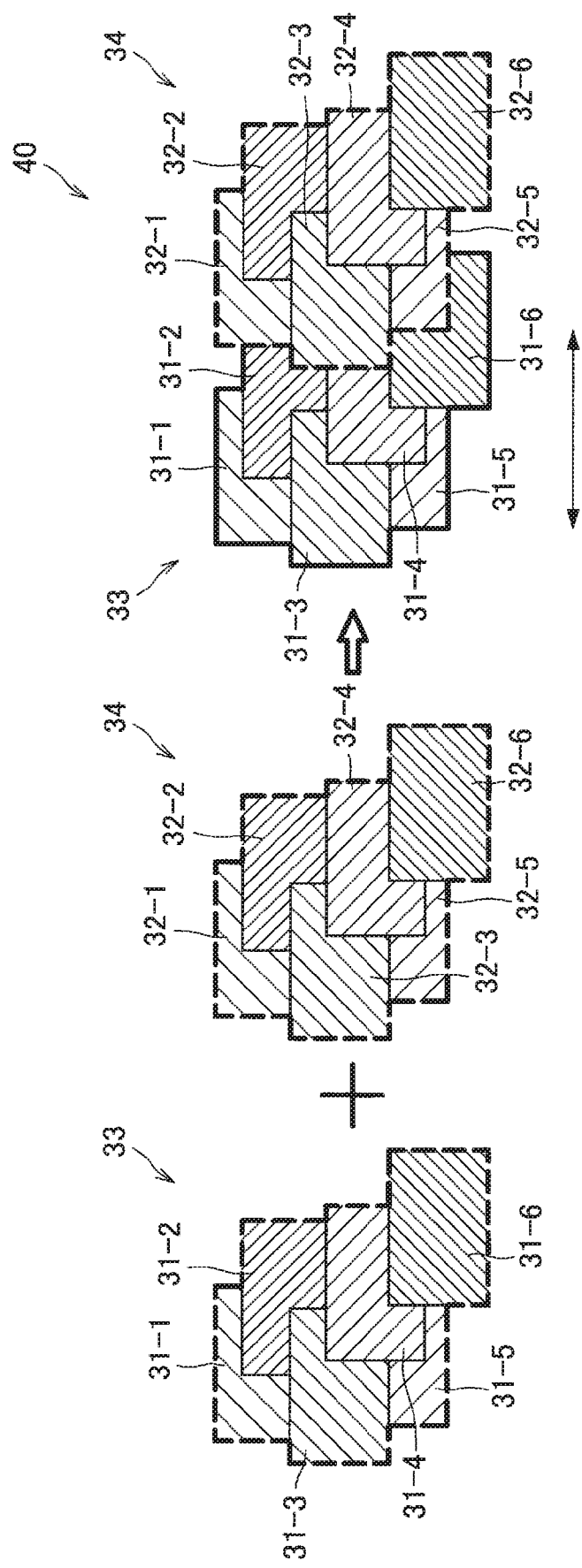
FIG. 12 is a diagram for describing a first example of generation of a registration image.

FIG. 12 is a diagram for describing the first example of generation of the registration image 40. As shown in FIG. 12, the registration image generation unit 112A generates the first composite image 33 on the basis of the first detection images 31-1 to 31-6, and generates the second composite image 34 on the basis of the second detection images 32-1 to 32-6. Then, the registration image generation unit 112A generates the registration image 40 on the basis of the first composite image 33 and the second composite image 34. Here, an example of composition of the first detection image 31-1 and the first detection image 31-2 will be described.

Figure 13:
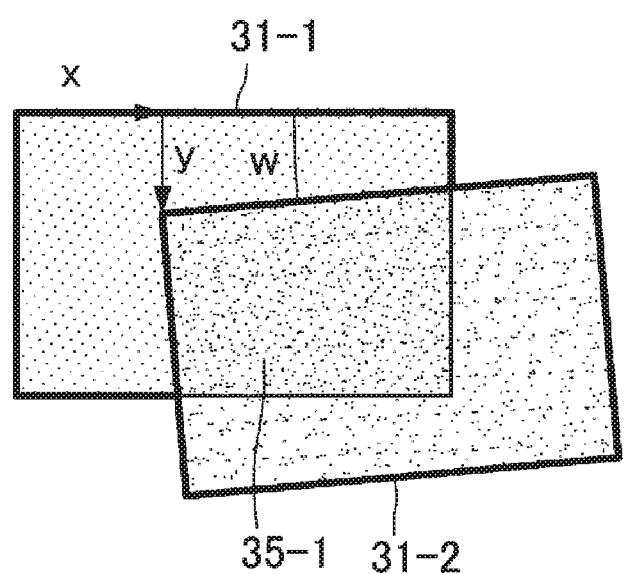
FIG. 13 is a diagram for describing an example of composition of two first detection images.

FIG. 13 is a diagram for describing an example of composition of two first detection images 31. Referring to FIG. 13, the first detection image 31-1 and the first detection image 31-2 are shown. The registration image generation unit 112A calculates a relative position of the first detection image 31-2 relative to the first detection image 31-1 in a case where the degree of agreement in an overlapping region 35-1 between the first detection image 31-1 and the first detection image 31-2 is maximized.

The degree of agreement in the overlapping region 35-1 between the first detection image 31-1 and the first detection image 31-2 may be calculated in any manner. For example, the degree of agreement in the overlapping region 35-1 between the first detection image 31-1 and the first detection image 31-2 may be the lowness of the total sum of absolute values of differences in pixel value between overlapping pixels in the overlapping region 35-1, or may be the lowness of the total sum of squares of differences in pixel value between overlapping pixels in the overlapping region 35-1.

In addition, the expression form of the relative position of the first detection image 31-2 relative to the first detection image 31-1 is not limited. In the example shown in FIG. 13, the relative position is expressed by a relative position (x, y) at the upper left corner of the first detection image 31-2 relative to the upper left corner of the first detection image 31-1 and a rotation angle (w) from the first detection image 31-1 to the first detection image 31-2 centering on a predetermined position.

After calculating the relative position (x, y, w) of the first detection image 31-2 relative to the first detection image 31-1, the registration image generation unit 112A completes composition of the first detection image 31-1 and the first detection image 31-2 by performing processing of reducing images existing in the overlapping region 35-1 to one. For example, the registration image generation unit 112A may leave only an image determined in advance between two images existing in the overlapping region 35-1, or may leave only an image where the finger is reflected more clearly, or may generate an image by integrating two images.

An example of composition of the first detection image 31-1 and the first detection image 31-2 has been described above. By performing similar composition, the registration image generation unit 112A is capable of generating the first composite image 33 and the second composite image 34. Subsequently, the registration image generation unit 112A determines the positional relationship detected by the image sensor unit 21-1 and the image sensor unit 21-2 at corresponding timings as the positional relationship between two images. Then, the registration image generation unit 112A generates the registration image 40 on the basis of the determined positional relationship between two images, the first composite image 33, and the second composite image 34.

The positional relationship between two images may be determined in any manner. As an example, the registration image generation unit 112A may determine the positional relationship between two images on the basis of detection images detected by the image sensor unit 21-1 and the image sensor unit 21-2, respectively, at corresponding timings and a detection image detected by either the image sensor unit 21-1 or the image sensor unit 21-2. Which detection images are to be utilized as these detection images is not limited.

For example, the registration image generation unit 112A may determine the positional relationship between two images on the basis of the first detection image 31-1 and the second detection image 32-1 detected by the image sensor unit 21-1 and the image sensor unit 21-2, respectively, at corresponding timings and the first detection image 31-2 detected by the image sensor unit 21-1.

In a case where the second detection image 32-1 and the first detection image 31-2 overlap each other, the registration image generation unit 112A calculates a relative position of the first detection image 31-2 relative to the second detection image 32-1 in a case where the degree of agreement in an overlapping region (not shown) between the second detection image 32-1 and the first detection image 31-2 is maximized. Calculation of such a relative position may be performed similarly to the above-described calculation of the relative position of the first detection image 31-2 relative to the first detection image 31-1.

Subsequently, the registration image generation unit 112A is capable of determining a relative position of the second detection image 32-1 relative to the first detection image 31-1 as the positional relationship between the first composite image 33 and the second composite image 34 (the positional relationship between two images) on the basis of the relative position of the first detection image 31-2 relative to the first detection image 31-1 and a relative position of the second detection image 32-1 relative to the first detection image 31-2.

Subsequently, the registration image generation unit 112A arranges the first composite image 33 and the second composite image 34 such that the first detection image 31-1 and the second detection image 32-1 have the determined positional relationship between two images. Then, the registration image generation unit 112A is capable of generating the registration image 40 by performing processing of reducing images existing in an overlapping region (not shown) between the first composite image 33 and the second composite image 34 to one. The processing of reducing images existing in an overlapping region (not shown) to one may be performed similarly to the processing of reducing images existing in the overlapping region 35-1 (FIG. 13) to one.

Figure 14:
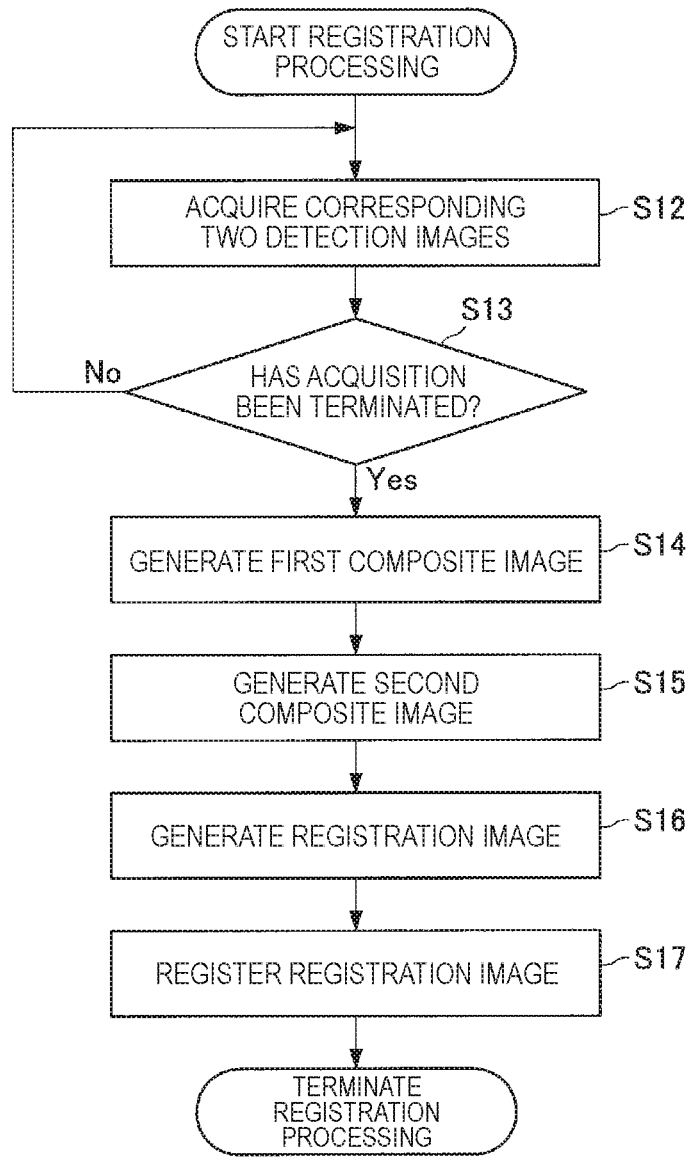
FIG. 14 is a flowchart showing an exemplary operation of registration processing in a case where the first example of generation of a registration image is utilized.

FIG. 14 is a flowchart showing an exemplary operation of registration processing in a case where the first example of generation of the registration image 40 is utilized. As shown in FIG. 14, first, in a case where a predetermined registration manipulation is performed, the registration image generation unit 112A acquires corresponding two detection images (S12). In more detail, the registration image generation unit 112A acquires a first detection image 31 and a second detection image 32 detected by the image sensor unit 21-1 and the image sensor unit 21-2, respectively, at corresponding timings.

Subsequently, in a case where acquisition of corresponding two detection images has not been terminated ("No" in S13), the registration image generation unit 112A proceeds into S12, and acquires a next first detection image 31 and a next second detection image 32. On the other hand, in a case where acquisition of corresponding two detection images has been terminated ("Yes" in S13), the registration image generation unit 112A proceeds into S14. Specifically, in a case where the first detection images 31-1 to 31-6 and the second detection images 32-1 to 32-6 have been acquired, acquisition of corresponding two detection images is terminated.

Subsequently, the registration image generation unit 112A generates the first composite image 33 on the basis of the first detection images 31-1 to 31-6 (S14), and generates the second composite image 34 on the basis of the second detection images 32-1 to 32-6 (S15). Then, the registration image generation unit 112A generates the registration image 40 on the basis of the first composite image 33 and the second composite image 34 (S16). The registration image generation unit 112A registers the generated registration image 40 in the storage unit 150 (S17), and then terminates the registration processing.

The first example of generation of the registration image 40 has been described above. Subsequently, a second example of generation of the registration image 40 will be described. Specifically, the second example of generation of the registration image 40 corresponds to exemplary generation of the registration image 40 in a case where the positional relationship between two images detected by the image sensor unit 21-1 and the image sensor unit 21-2 at corresponding timings has been stored in advance in the storage unit 150, and this positional relationship is acquired by the registration image generation unit 112A.

Figure 15:
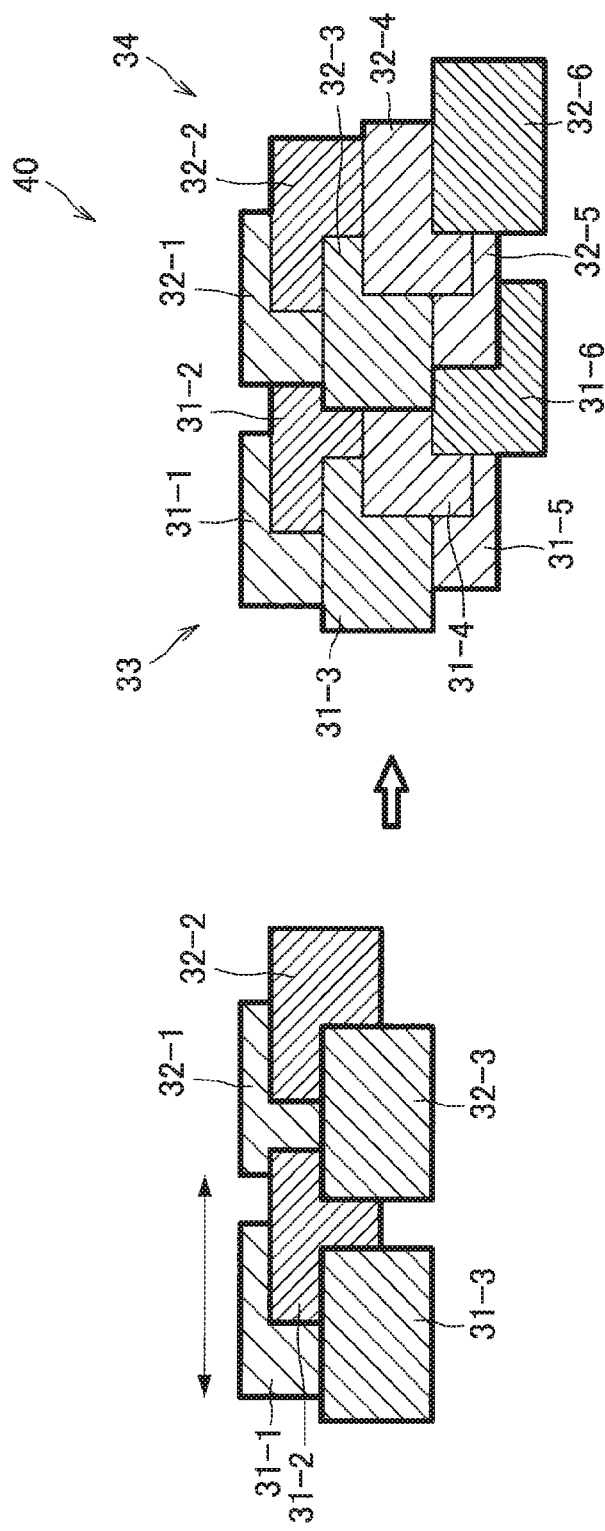
FIG. 15 is a diagram for describing a second example of generation of a registration image.

FIG. 15 is a diagram for describing the second example of generation of the registration image 40. The registration image generation unit 112A acquires the positional relationship between two images detected by the image sensor unit 21-1 and the image sensor unit 21-2 at corresponding timings from the storage unit 150. Then, the registration image generation unit 112A generates the registration image 40 on the basis of the acquired positional relationship between two images, the first detection images 31-1 to 31-6, and the second detection images 32-1 to 32-6.

The expression form of the positional relationship between two images detected by the image sensor unit 21-1 and the image sensor unit 21-2 at corresponding timings is not limited. For example, the positional relationship between two images is expressed by a relative position (s, t) at the upper left corner of the second detection image 32-1 relative to the right upper corner of the first detection image 31-1 and a rotation angle (r) from the first detection image 31-1 to the second detection image 32-1 centering on a predetermined position.

More specifically, the registration image generation unit 112A acquires a positional relationship (s, t, r) between two images detected at corresponding timings, and then arranges the first detection image 31-1 and the second detection image 32-1 such that the first detection image 31-1 and the second detection image 32-1 have the acquired positional relationship (s, t, r) between two images. Similarly, the registration image generation unit 112A arranges the first detection images 31-2 to 31-6 and the second detection images 32-2 to 32-6.

Then, the registration image generation unit 112A is capable of generating the registration image 40 by performing processing of reducing images existing in an overlapping region (not shown) between the first detection images 31-1 to 31-6 and the second detection images 32-1 to 32-6 to one. The processing of reducing images existing in the overlapping region (not shown) to one may be performed similarly to the processing of reducing images existing in the overlapping region 35-1 (FIG. 13) to one.

Figure 16:
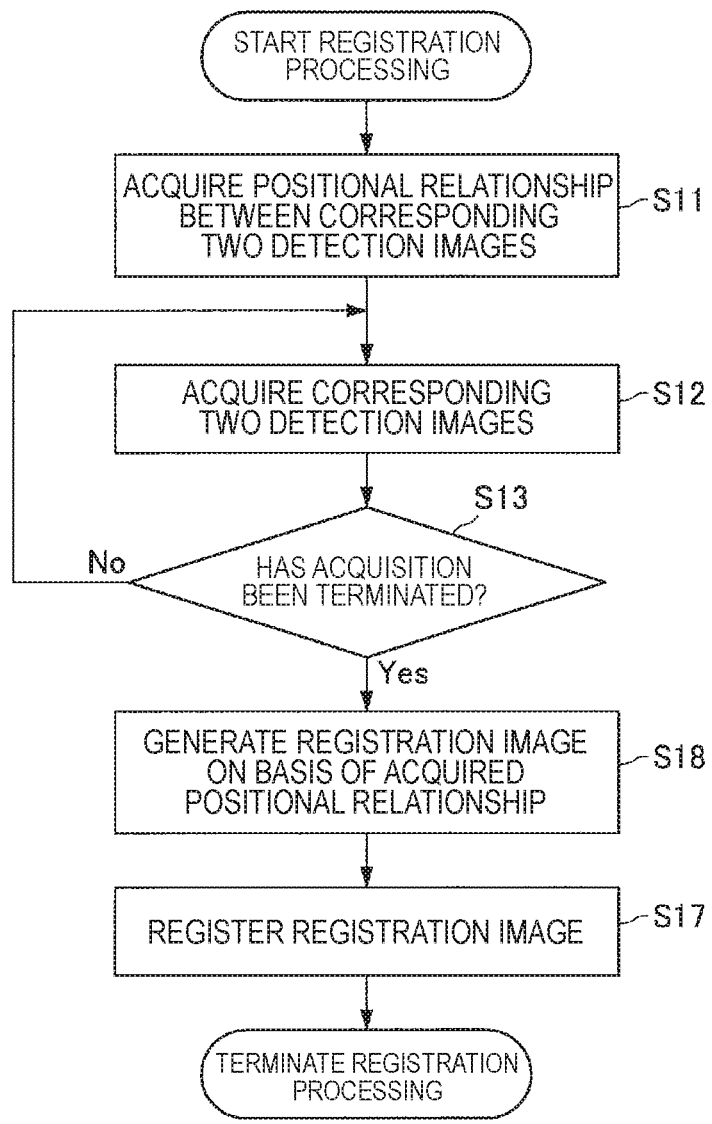
FIG. 16 is a flowchart showing an exemplary operation of registration processing in a case where the second example of generation of a registration image is utilized.

FIG. 16 is a flowchart showing an exemplary operation of registration processing in a case where the second example of generation of the registration image 40 is utilized. As shown in FIG. 16, first, in a case where a predetermined registration manipulation has been performed, the registration image generation unit 112A acquires the positional relationship between corresponding two detection images (the positional relationship between two images detected by the image sensor unit 21-1 and the image sensor unit 21-2 at corresponding timings) from the storage unit 150 (S11).

Subsequently, the registration image generation unit 112A acquires corresponding two detection images (S12). In more detail, the registration image generation unit 112A acquires a first detection image 31 and a second detection image 32 detected by the image sensor unit 21-1 and the image sensor unit 21-2, respectively, at corresponding timings.

Subsequently in a case where acquisition of corresponding two detection images has not been terminated ("No" in S13), the registration image generation unit 112A proceeds into S12, and acquires a next first detection image 31 and a next second detection image 32. On the other hand, in a case where acquisition of corresponding two detection images has been terminated ("Yes" in S13), the registration image generation unit 112A proceeds into S18. Specifically, in a case where the first detection images 31-1 to 31-6 and the second detection images 32-1 to 32-6 have been acquired, acquisition of corresponding two detection images is terminated.

Subsequently, the registration image generation unit 112A generates the registration image 40 on the basis of the acquired positional relationship (S18). In more detail, the registration image generation unit 112A generates the registration image 40 on the basis of the positional relationship between two images detected by the image sensor unit 21-1 and the image sensor unit 21-2 at corresponding timings, the first detection images 31-1 to 31-6, and the second detection images 32-1 to 32-6. The registration image generation unit 112A registers the generated registration image 40 in the storage unit 150 (S17), and then terminates the registration processing.

The second example of generation of the registration image 40 has been described above. Subsequently, a third example of generation of the registration image 40 will be described. Specifically, the positional relationship between the image sensor unit 21-1 and the image sensor unit 21-2 stored in the storage unit 150 is not necessarily correct. The third example of generation of the registration image 40 corresponds to exemplary generation of the registration image 40 in a case where this positional relationship is corrected by the registration image generation unit 112A.

Figure 17:
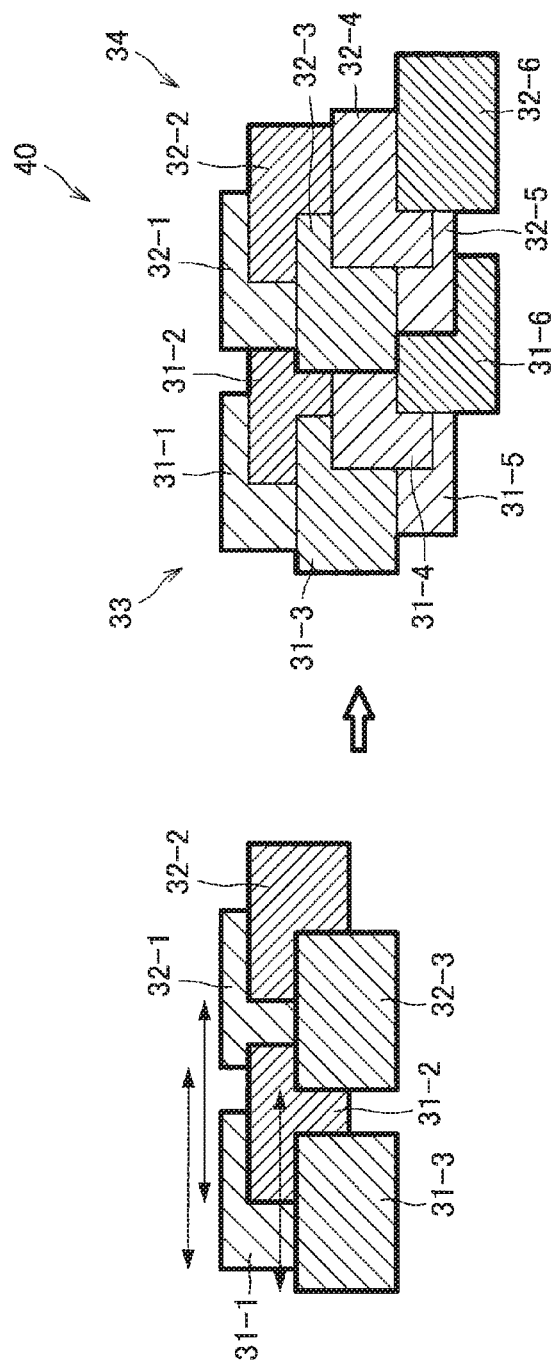
FIG. 17 is a diagram for describing a third example of generation of a registration image.

FIG. 17 is a diagram for describing the third example of generation of the registration image 40. The registration image generation unit 112A acquires the positional relationship between two images detected by the image sensor unit 21-1 and the image sensor unit 21-2 at corresponding timings from the storage unit 150. Here, in the third example, the registration image generation unit 112A corrects the acquired positional relationship between two images.

For example, the registration image generation unit 112A corrects the positional relationship between two images on the basis of detection images detected by the image sensor unit 21-1 and the image sensor unit 21-2, respectively, at corresponding timings, and a detection image detected by either the image sensor unit 21-1 or the image sensor unit 21-2. Then, the registration image generation unit 112A generates the registration image 40 on the basis of the positional relationship between two images after correction, the first detection images 31-1 to 31-6, and the second detection images 32-1 to 32-6.

Figure 18:
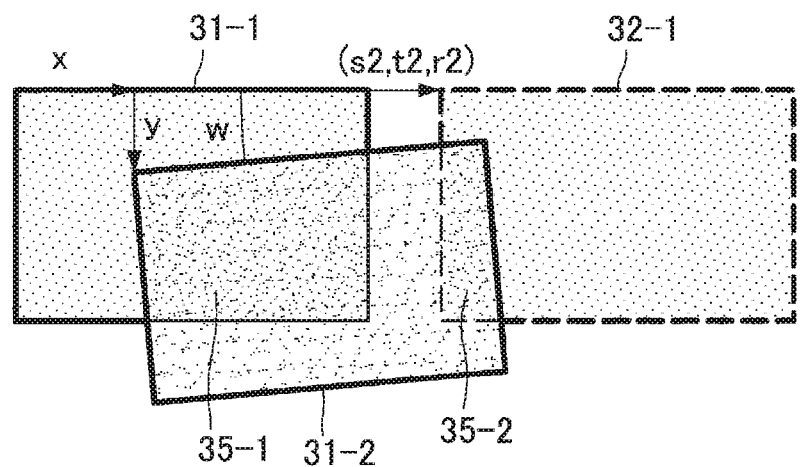
FIG. 18 is a diagram for describing an example of correction of the positional relationship between two images.

FIG. 18 is a diagram for describing an example of correction of the positional relationship between two images. As shown in FIG. 18, a case where a positional relationship (s2, t2, r2) between the first detection image 31-1 and the second detection image 32-1 has been acquired as the positional relationship between two images is assumed. The relative positions of the first detection image 31-1 and the first detection image 31-2 may be calculated in a manner as described with reference to FIG. 13. Here, the registration image generation unit 112A corrects the positional relationship (s2, t2, r2) between two images.

For example, the registration image generation unit 112A searches for a case where the degree of agreement between the first detection image 31-2 and the second detection image 32-1 in an overlapping region 35-2 is maximized while changing the positional relationship between two images within a predetermined range relative to the positional relationship (s2, t2, r2) between two images. Then, the registration image generation unit 112A calculates the relative position of the second detection image 32-1 relative to the first detection image 31-1 in the case where the degree of agreement is maximized as the positional relationship between two images after correction.

More specifically, the registration image generation unit 112A arranges the first detection image 31-1 and the second detection image 32-1 such that the first detection image 31-1 and the second detection image 32-1 have the positional relationship between two images after correction. Similarly, the registration image generation unit 112A arranges the first detection images 31-2 to 31-6 and the second detection images 32-2 to 32-6.

Then, the registration image generation unit 112A is capable of generating the registration image 40 by performing processing of reducing images existing in an overlapping region (not shown) between the first detection images 31-1 to 31-6 and the second detection images 32-1 to 32-6 to one. The processing of reducing images existing in the overlapping region (not shown) to one may be performed similarly to the processing of reducing images existing in the overlapping region 35-1 (FIG. 13) to one.

An example of correction of the positional relationship between two images has been described above. Subsequently, a variation of correction of the positional relationship between two images will be described. Specifically, in the example of correction of the positional relationship between two images described with reference to FIG. 18, the degree of agreement between the first detection image 31-2 and the second detection image 32-1 in the overlapping region 35-2 shall be considered. In the variation of correction of the positional relationship between two images, the degree of agreement in another overlapping region will be further considered in order to further increase the accuracy of correction.

Figure 19:
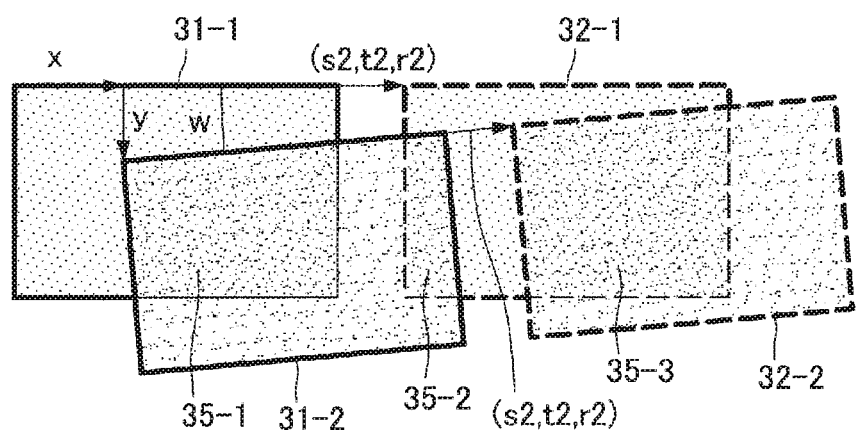
FIG. 19 is a diagram for describing a variation of correction of the positional relationship between two images.

FIG. 19 is a diagram for describing a variation of correction of the positional relationship between two images. As shown in FIG. 19, a case where a positional relationship between the first detection image 31-1 and the second detection image 32-1 (and a positional relationship between the first detection image 31-2 and the second detection image 32-2) (s2, t2, r2) have been acquired as the positional relationship between two images is assumed. The relative positions of the first detection image 31-1 and the first detection image 31-2 may be calculated in a manner as described with reference to FIG. 13. Here, the registration image generation unit 112A corrects the positional relationship (s2, t2, r2) between two images.

For example, the registration image generation unit 112A searches for a case where the degree of agreement between the first detection image 31-2 and the second detection image 32-1 in an overlapping region 35-2 and the degree of agreement between the second detection image 32-2 and the second detection image 32-2 in an overlapping region 35-3 are maximized while changing the positional relationship between two images within a predetermined range relative to the positional relationship (s2, t2, r2) between two images. Then, the registration image generation unit 112A calculates the relative position of the second detection image 32-1 relative to the first detection image 31-1 in the case where the degree of agreement is maximized as the positional relationship between two images after correction.

More specifically, the registration image generation unit 112A arranges the first detection image 31-1 and the second detection image 32-1 such that the first detection image 31-1 and the second detection image 32-1 have the positional relationship between two images after correction. Similarly, the registration image generation unit 112A arranges the first detection images 31-2 to 31-6 and the second detection images 32-2 to 32-6.

Then, the registration image generation unit 112A is capable of generating the registration image 40 by performing processing of reducing images existing in an overlapping region (not shown) between the first detection images 31-1 to 31-6 and the second detection images 32-1 to 32-6 to one. The processing of reducing images existing in the overlapping region (not shown) to one may be performed similarly to the processing of reducing images existing in the overlapping region 35-1 (FIG. 13) to one.

Figure 20:
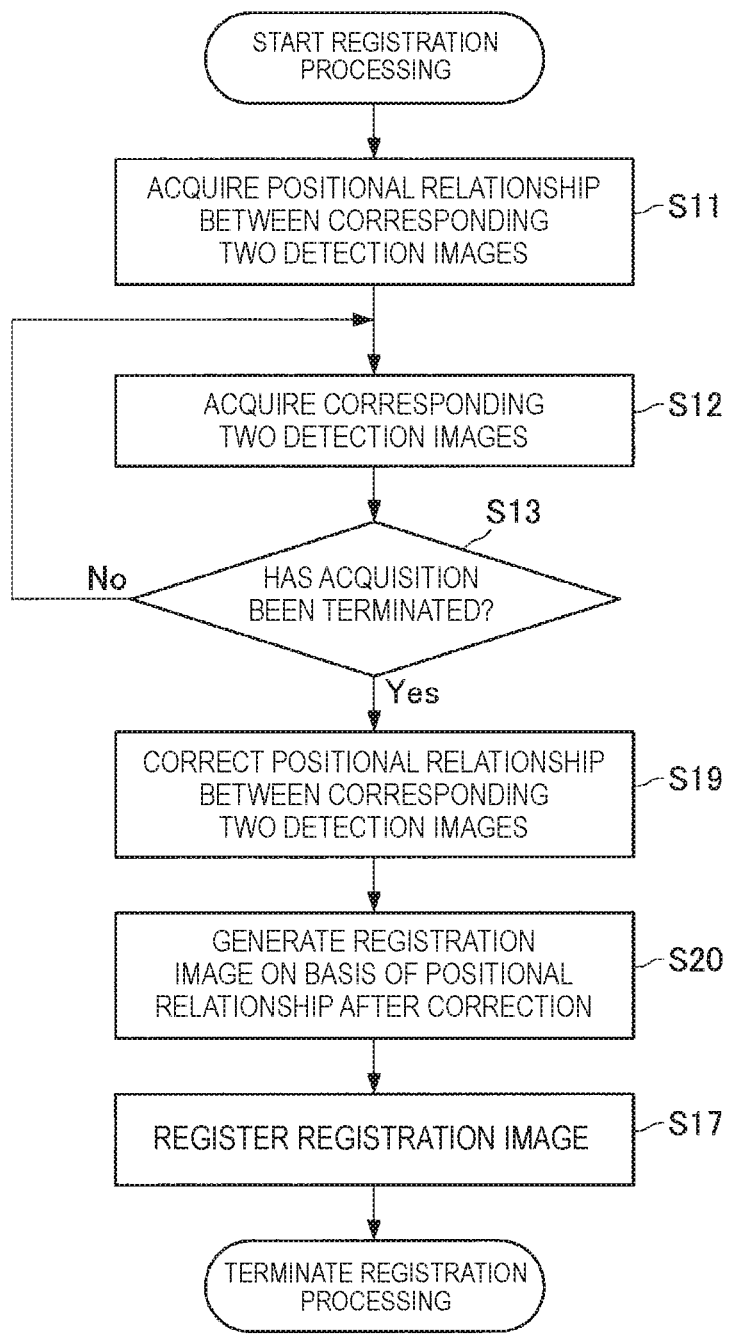
FIG. 20 is a flowchart showing an exemplary operation of registration processing in a case where the third example of generation of a registration image is utilized.

FIG. 20 is a flowchart showing an exemplary operation of registration processing in a case where the third example of generation of the registration image 40 is utilized. As shown in FIG. 20, first, in a case where a predetermined registration manipulation has been performed, the registration image generation unit 112A acquires the positional relationship between corresponding two detection images (the positional relationship between two images detected by the image sensor unit 21-1 and the image sensor unit 21-2 at corresponding timings) from the storage unit 150 (S11).

Subsequently, the registration image generation unit 112A acquires corresponding two detection images (S12). In more detail, the registration image generation unit 112A acquires a first detection image 31 and a second detection image 32 detected by the image sensor unit 21-1 and the image sensor unit 21-2, respectively, at corresponding timings.

Subsequently; in a case where acquisition of corresponding two detection images has not been terminated ("No" in S13), the registration image generation unit 112A proceeds into S12, and acquires a next first detection image 31 and a next second detection image 32. On the other hand, in a case where acquisition of corresponding two detection images has been terminated ("Yes" in S13), the registration image generation unit 112A proceeds into S19. Specifically, in a case where the first detection images 31-1 to 31-6 and the second detection images 32-1 to 32-6 have been acquired, acquisition of corresponding two detection images is terminated.

Subsequently, the registration image generation unit 112A corrects the positional relationship between corresponding two detection images (S19). Subsequently, the registration image generation unit 112A generates the registration image 40 on the basis of the positional relationship after correction (S20). In more detail, the registration image generation unit 112A generates the registration image 40 on the basis of the positional relationship after correction, the first detection images 31-1 to 31-6, and the second detection images 32-1 to 32-6. The registration image generation unit 112A registers the generated registration image 40 in the storage unit 150 (S17), and then terminates the registration processing.

[1.4. Authentication Processing]

The third example of generation of the registration image 40 has been described above. When the registration image 40 is registered in this manner, the registration image 40 is utilized for biometric authentication. The timing when authentication processing is performed is not limited. For example, in a case where a predetermined authentication manipulation (for example, a manipulation of pressing down an authentication start button, or the like) by a user (user under authentication) is performed, authentication processing may be performed. Hereinafter, an example of authentication processing will be described.

Figure 21:
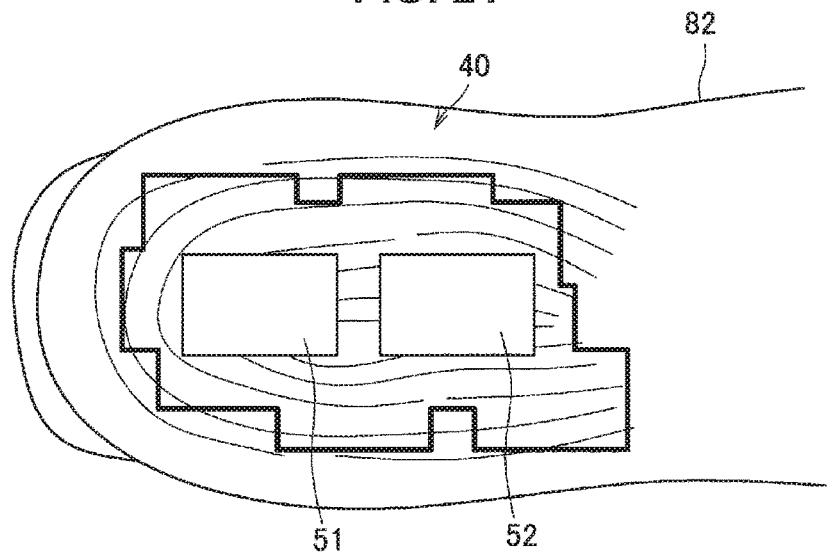
FIG. 21 is a diagram for describing an overview of authentication processing.

FIG. 21 is a diagram for describing an overview of authentication processing. First, when a predetermined authentication manipulation is performed by the user under authentication, a third detection image is detected by the image sensor unit 21-1, and a fourth detection image is detected by the image sensor unit 21-2.

Referring to FIG. 21, an example in which a third detection image 51 is detected by the image sensor unit 21-1, and a fourth detection image 52 is detected by the image sensor unit 21-2 is shown. However, the number of each of the third detection image and the fourth detection image is not limited to one, but may be plural. Note that, in FIG. 21, the third detection image 51 and the fourth detection image 52 are respectively shown at corresponding positions on a finger 82).

Specifically, when a display that prompts to bring the finger into contact with the image sensors is made by the output unit 160, the user under authentication looking at the display brings the finger into contact with the image sensor unit 21-1 and the image sensor unit 21-2. Subsequently, the third detection image 51 is detected by the image sensor unit 21-1, and the fourth detection image 52 is detected by the image sensor unit 21-2. At this time, the timings when detecting the third detection image 51 and the fourth detection image 52 may be shifted slightly.

An authentication processing unit 113A performs authentication processing on the basis of the third detection image 51 and the fourth detection image 52 detected in this manner as well as the registration image 40 generated by the registration image generation unit 112A. According to such a configuration, authentication processing based on the registration image 40 generated by integrating respective detection images obtained by the image sensor unit 21-1 and the image sensor unit 21-2 may be performed. Here, a specific technique for authentication processing is not particularly limited.

For example, the authentication processing unit 113A generates an authentication image by arranging the third detection image 51 and the fourth detection image 52 such that the third detection image 51 and the fourth detection image 52 have a predetermined positional relationship. The predetermined positional relationship may be the positional relationship between two images detected by the image sensor unit 21-1 and the image sensor unit 21-2 at corresponding timings. Such a positional relationship may be the positional relationship having been stored in advance in the storage unit 150, or may be the positional relationship after correction performed by the registration image generation unit 112A, or may be the positional relationship determined by the registration image generation unit 112A, as described above.

Then, the authentication processing unit 113A compares the authentication image (an image in which the third detection image 51 and the fourth detection image 52 are arranged) and a registration image. More specifically, the authentication processing unit 113A may determine whether or not authentication has succeeded on the basis of whether or not a position at which the degree of agreement between the authentication image and the registration image in the overlapping region exceeds a threshold value exists while changing the position of the authentication image with respect to the registration image.

An operation to be performed in a case where authentication has succeeded and an operation to be performed in a case where authentication has failed are not particularly limited. For example, in the case where authentication has succeeded, the authentication processing unit 113A may permit access to a predetermined resource (for example, an application to be executed in the information processing device 10A or a predetermined server, or the like). On the other hand, in the case where authentication has failed, the authentication processing unit 113A may control output of predetermined information (for example, a message such as "authentication has failed" or the like) indicating the failure of authentication, and may execute the authentication processing again.

Figure 22:
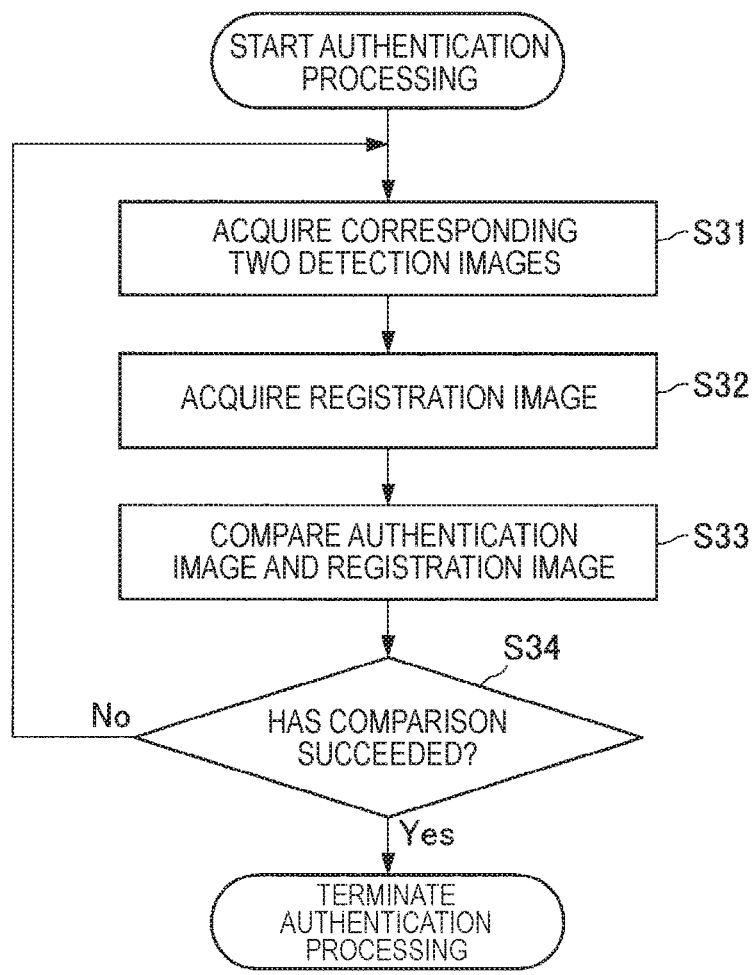
FIG. 22 is a flowchart showing an exemplary operation of authentication processing.

FIG. 22 is a flowchart showing an exemplary operation of authentication processing. As shown in FIG. 22, first, in a case where a predetermined authentication manipulation is performed, the authentication processing unit 113A acquires corresponding two detection images (S31). In more detail, the registration image generation unit 112A acquires the third detection image 51 and the fourth detection image 52 detected by the image sensor unit 21-1 and the image sensor unit 21-2, respectively, at corresponding timings. As described above, when the third detection image 51 and the fourth detection image 52 are arranged so as to have the predetermined positional relationship, an authentication image is generated.

Subsequently, the authentication processing unit 113A acquires the registration image 40 generated by the registration image generation unit 112A from the storage unit 150 (S32). Subsequently, the authentication processing unit 113A compares the authentication image and the registration image (S33). In a case where the comparison has failed ("No" in S34), the authentication processing unit 113A proceeds into S31. At this time, predetermined information indicating the failure of authentication may be output. On the other hand, in a case where the comparison has succeeded ("Yes" in S34), the authentication processing unit 113A terminates the authentication processing. At this time, access to a predetermined resource may be permitted.

The authentication processing has been described above. In addition, the first embodiment of the present disclosure has been described above.

2. Description of Second Embodiment

Subsequently, a second embodiment of the present disclosure will be described. According to the first embodiment of the present disclosure, it is possible to sufficiently ensure the area of the image sensors as a whole, and to improve the accuracy of biometric authentication. Further, with improvement in accuracy of biometric authentication, it is also possible to perform a plurality of types of biometric authentication concurrently. Therefore, in the second embodiment of the present disclosure, an example in which a plurality of types of biometric authentication is performed concurrently will be mainly described. Note that performing a plurality of types of biometric authentication "concurrently" means performing a plurality of types of biometric authentication by the same operation, and does not necessarily mean performing a plurality of types of biometric authentication at the same time.

[2.1. Exemplary Functional Configuration]

Figure 23:
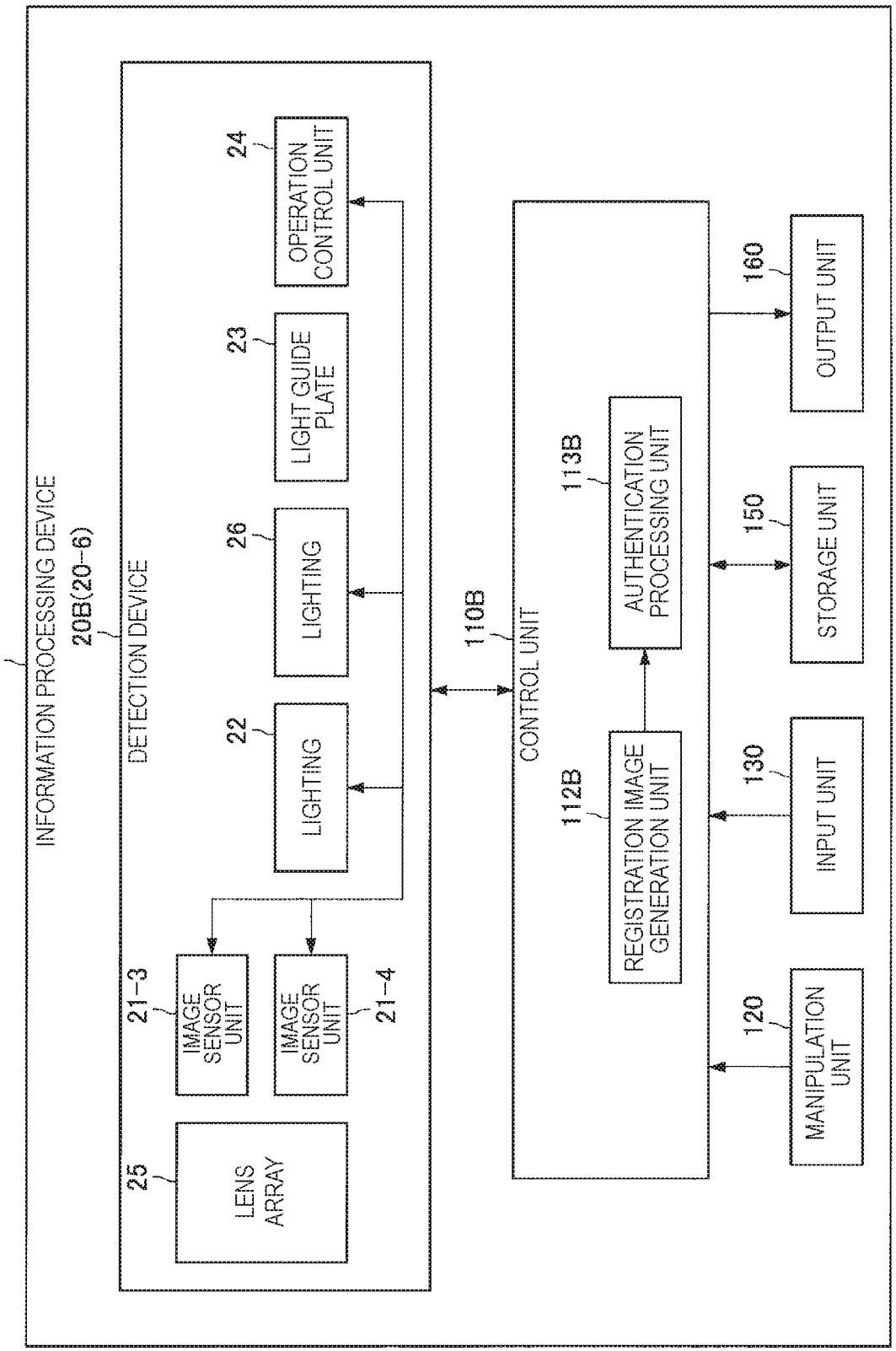
FIG. 23 is a diagram showing an exemplary functional configuration of an information processing device according to a second embodiment of the present disclosure.

First, an exemplary functional configuration of an information processing device according to the second embodiment of the present disclosure will be described. FIG. 23 is a diagram showing an exemplary functional configuration of the information processing device according to the second embodiment of the present disclosure. As shown in FIG. 23, an information processing device 10B according to the second embodiment of the present disclosure is different from the information processing device 10A according to the first embodiment of the present disclosure in that the information processing device 10B has a detection device 20B instead of the detection device 20A, and has a control unit 110B instead of the control unit 110A. Consequently, hereinafter, the detection device 20B and the control unit 110B will be mainly described.

The detection device 20B is different from the detection device 20A according to the first embodiment of the present disclosure in that the detection device 20B includes an image sensor unit 21-3 and an image sensor unit 21-4 instead of the image sensor unit 21-1 and the image sensor unit 21-2. In addition, the detection device 20B is different from the detection device 20A according to the first embodiment of the present disclosure in that the detection device 20B includes a lens array 25 and a lighting 26. Consequently, hereinafter, the image sensor unit 21-3, the image sensor unit 21-4, the lens array 25, and the lighting 26 will be mainly described.

The control unit 110B is different from the control unit 110A according to the first embodiment of the present disclosure in that the control unit 110B includes a registration image generation unit 112B and an authentication processing unit 113B instead of the registration image generation unit 112A and the authentication processing unit 113A. Consequently, hereinafter, the registration image generation unit 112B and the authentication processing unit 113B will be mainly described.

An exemplary functional configuration of the information processing device 10B according to the second embodiment of the present disclosure has been described above.

[2.2. Exemplary Configuration of Detection Device]

Figure 24:
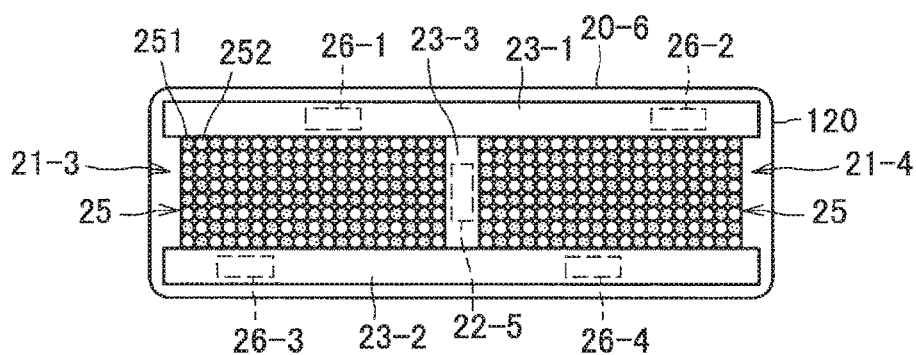
FIG. 24 is a diagram showing an exemplary configuration of a detection device according to the second embodiment of the present disclosure.
Figure 25:
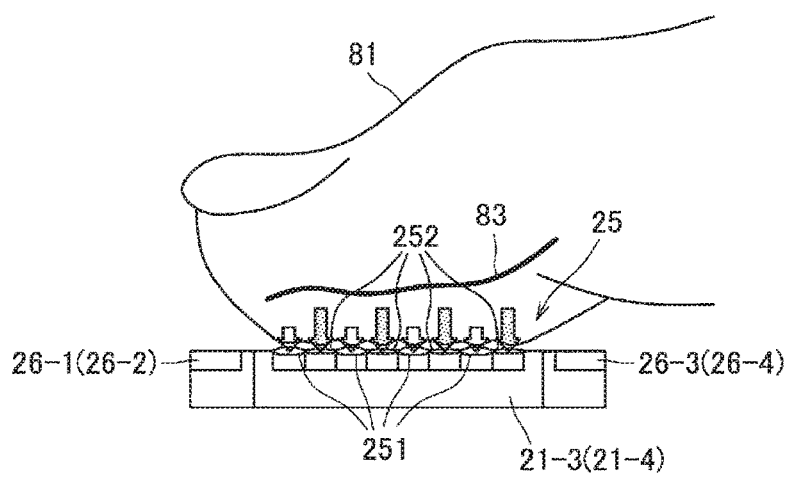
FIG. 25 is a lateral view of a utilization image of the detection device according to the second embodiment of the present disclosure.

Subsequently, functional details of the information processing device 10B according to the second embodiment of the present disclosure will be described. FIG. 24 is a diagram showing an exemplary configuration of the detection device 20B according to the second embodiment of the present disclosure. FIG. 25 is a lateral view of a utilization image of the detection device 20B according to the second embodiment of the present disclosure.

Referring to FIG. 24, a detection device 20-6 as an example of the detection device 20B has the image sensor unit 21-3 and the image sensor unit 21-4 as two image sensor units 21. Then, the image sensor unit 21-3 and the image sensor unit 21-4 are arranged on the same plane. In addition, referring to FIG. 24, the image sensor unit 21-4 is arranged in the longitudinal direction of the image sensor unit 21-3 relative to the image sensor unit 21-3.

The detection device 20-6 includes the light guide plates 23-1 to 23-3, the lighting 22-5, and lightings 26-1 to 26-4. The lighting 22-5 emits light of a first wavelength, and the light of the first wavelength emitted by the lighting 22-5 is guided into the light guide plate 23-3, and is diffused in the surface of the light guide plate 23-3.

On the other hand, the lightings 26-1, 26-2 each emit light of a second wavelength different from the first wavelength, and the light of the second wavelength emitted by the lightings 26-1, 26-2 is guided into the light guide plate 23-1, and is diffused in the surface of the light guide plate 23-1. The lightings 26-3, 26-4 each emit light of the second wavelength, and the light of the second wavelength emitted by the lightings 26-4, 26-4 is guided into the light guide plate 23-2, and is diffused in the surface of the light guide plate 23-2.

Hereinafter, a case where visible light utilized for imaging the fingerprint of the finger 81 is utilized as an example of light of the first wavelength, and infrared light utilized for imaging a vein 83 is utilized as an example of light of the second wavelength will be mainly described. However, light of the first wavelength and light of the second wavelength are not limited.

Note that, in the example shown in FIG. 24, the number of the lightings 22 that emit visible light is one, and the number of the lightings 26 that emit infrared light is four. However, the number of each of the lighting 22 that emits visible light and the lightings 26 that emit infrared light is not limited. The position at which each of the lighting 22 that emits visible light and the lightings 26 that emit infrared light is provided is also not limited. For example, the lighting 22 may be provided at the position of the lighting 22 illustrated in the first embodiment of the present disclosure.

In addition, the lighting 22 that emits visible light and the lightings 26 that emit infrared light may be LED lightings. In the present specification, an example where the lighting 22 that emits visible light and the lightings 26 that emit infrared light are configured separately will be mainly described, whilst the lighting 22 and the lightings 26 may be configured integrally.

The lens array 25 includes a first lens group 251 and a second lens group 252 having a focal length different from that of the first lens group 251. For example, as shown in FIG. 25, the lens array 25 is arranged so as to cover the outside of the image sensor unit 21-3 and the image sensor unit 21-3 such that the finger 81 is brought into direct contact.

The image sensor unit 21-3 and the image sensor unit 21-4 have a first light receiving element group that detects visible light transmitted through the first lens group 251 and a second light receiving element group that detects infrared light transmitted through the second lens group 252. Note that, in the example shown in FIG. 24 and FIG. 25, the first lens group 251 and the second lens group 252 are arranged alternately, whilst the arrangement of the first lens group 251 and the second lens group 252 is not limited to such an example. For example, the second lens group 252 may be sparse than the first lens group 251.

Part of visible light diffused in the surface of the light guide plate 23-3 is transmitted through the first lens group 251, and is received by the first light receiving element groups (not shown) of the image sensor unit 21-3 and the image sensor unit 21-4. On the other hand, part of infrared light diffused in the surface of the light guide plates 23-1, 23-2 is transmitted through the second lens group 252, and is received by the second light receiving element groups (not shown) of the image sensor unit 21-3 and the image sensor unit 21-4. According to such a configuration, it is possible to obtain a fingerprint image and a vein image concurrently. Note that obtaining a fingerprint image and a vein image concurrently means obtaining a fingerprint image and a vein image by the same operation, and does not necessarily mean obtaining a fingerprint image and a vein image at the same time.

[2.3. Registration Processing]

An exemplary configuration of the detection device 20B according to the second embodiment of the present disclosure has been mainly described above. When registering an image, registration of a fingerprint image and a vein image to be utilized for biometric authentication is performed utilizing a detection result by the detection device 20B having such a configuration. The timing when image registration is performed is not limited. As an example, in a case where a predetermined registration manipulation (for example, a manipulation of pressing down a registration start button or the like) by a user (registered user) is performed, image registration may be performed. Hereinafter, an example of image registration will be described.

First, when a predetermined registration manipulation is performed by a registered user, the first light receiving element groups (not shown) that the image sensor unit 21-3 and the image sensor unit 21-4 have detect visible light transmitted through the first lens group 251 as a first detection result. The registration image generation unit 112B generates a first registration image (hereinafter also referred to as a "registered fingerprint image") to be compared with a first authentication image (hereinafter also referred to as an "authentication fingerprint image") on the basis of the first detection result. The registered fingerprint image may be generated similarly to generation of the registration image 40 shown in the first embodiment of the present disclosure. The registration image generation unit 112B registers the registered fingerprint image in the storage unit 150.

Meanwhile, the second light receiving element groups (not shown) that the image sensor unit 21-3 and the image sensor unit 21-4 have detect infrared light transmitted through the second lens group 252 as a second detection result. The registration image generation unit 112B generates a second registration image (hereinafter also referred to as a "registered vein image") to be compared with a second authentication image (hereinafter also referred to as an "authentication vein image") on the basis of the second detection result. The registered vein image may be generated similarly to generation of the registration image 40 shown in the first embodiment of the present disclosure. The registration image generation unit 112B registers the registered vein image in the storage unit 150.

[2.4. Authentication Processing]

The example of generation of the registered fingerprint image and the registered vein image has been described above. When the registered fingerprint image and the registered vein image are registered in this manner, the registered fingerprint image and the registered vein image are utilized for biometric authentication. The timing when authentication processing is performed is not limited. For example, in a case where a predetermined authentication manipulation (for example, a manipulation of pressing down an authentication start button, or the like) by a user (user under authentication) is performed, authentication processing may be performed. Hereinafter, an example of authentication processing will be described.

First, when a predetermined authentication manipulation is performed by a user under authentication, the first light receiving element groups (not shown) that the image sensor unit 21-3 and the image sensor unit 21-4 have detect visible light transmitted through the first lens group 251 as a third detection result. The authentication processing unit 113B generates an authentication fingerprint image on the basis of the third detection result. The authentication fingerprint image may be generated similarly to generation of the authentication image shown in the first embodiment of the present disclosure.

Meanwhile, the second light receiving element groups (not shown) that the image sensor unit 21-3 and the image sensor unit 21-4 have detect infrared light transmitted through the second lens group 252 as a fourth detection result. The authentication processing unit 113B generates an authentication vein image on the basis of the fourth detection result. The authentication vein image may be generated similarly to generation of the authentication image shown in the first embodiment of the present disclosure.

The authentication processing unit 113B is capable of performing first authentication processing based on the authentication fingerprint image and the registered fingerprint image. In more detail, the authentication processing unit 113B is capable of performing the first authentication processing by comparing the authentication fingerprint image and the registered fingerprint image. Such comparison and an operation based on a comparison result may be performed similarly to the comparison and the operation based on a comparison result shown in the first embodiment of the present disclosure.

Further, the authentication processing unit 113B is capable of performing second authentication processing based on the authentication vein image and the registered vein image. In more detail, the authentication processing unit 113B is capable of performing the second authentication processing by comparing the authentication vein image and the registered vein image. Such comparison and an operation based on a comparison result may also be performed similarly to the comparison and the operation based on a comparison result shown in the first embodiment of the present disclosure.

Here, the first authentication processing based on the authentication fingerprint image and the registered fingerprint image and the second authentication processing based on the authentication vein image and the registered vein image may be used separately depending on the situation, or may be utilized together. First, an example where the first authentication processing based on the authentication fingerprint image and the registered fingerprint image and the second authentication processing based on the authentication vein image and the registered vein image are used separately depending on the situation.

For example, in a case where a predetermined first condition is met, the authentication processing unit 113B may perform the first authentication processing based on the authentication fingerprint image and the registered fingerprint image. On the other hand, in a case where a predetermined second condition is met, the authentication processing unit 113B may perform the second authentication processing based on the authentication vein image and the registered vein image. Here, there is no limitation on what kind of condition each of the first condition and the second condition is. An example of each of the first condition and the second condition will be described.

Figure 26:
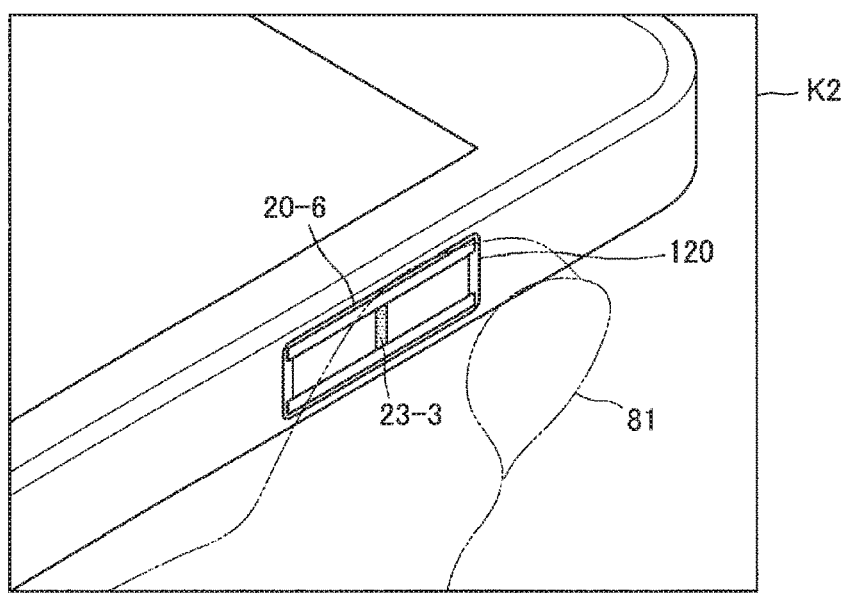
FIG. 26 is a diagram showing a utilization image in a case where first authentication processing based on an authentication fingerprint image and a registered fingerprint image is performed.

FIG. 26 is a diagram showing a utilization image in a case where the first authentication processing based on the authentication fingerprint image and the registered fingerprint image is performed. An enlarged view K2 is a diagram representing the detection device 20-6 provided on the surface of the manipulation unit 120 and a portion surrounding the detection device 20-6 in an enlarged manner, and the light guide plate 23-3 that diffuses visible light utilized for capturing a fingerprint image has been colored.

For example, since a fingerprint image easily leaks out, and it is easy in some cases to create, on the basis of a fingerprint image, a finger having a fingerprint similar to that fingerprint (using gelatin or the like), it is considered that the accuracy of authentication processing through use of a fingerprint image is lower. However, as shown in FIG. 26, a fingerprint image is captured if a user touches the detection device 20-6 with a fingertip, and thus may be acquired easily. Therefore, the first condition for performing the first authentication processing based on the authentication fingerprint image and the registered fingerprint image may be a case where cancellation of a state (locked state) in which the information processing device 10A is locked is requested, or the like.

Figure 27:
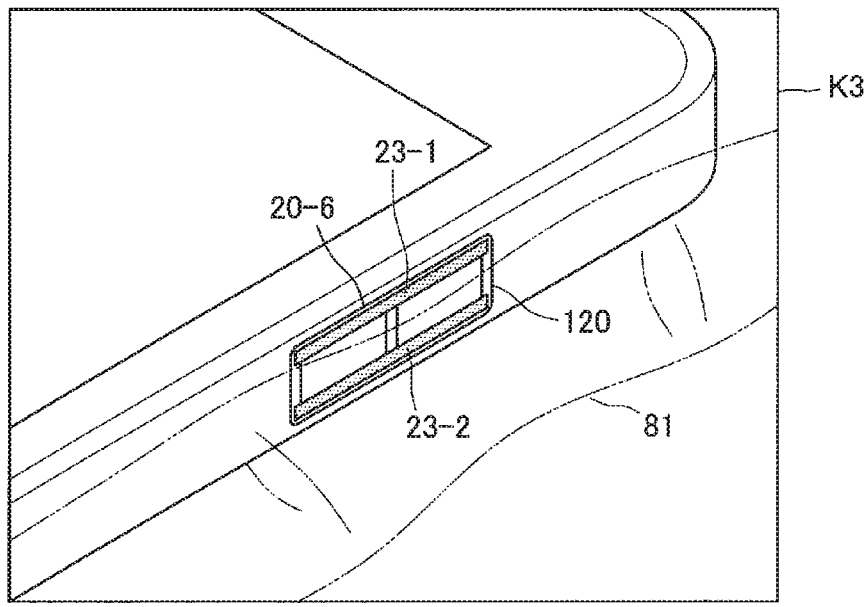
FIG. 27 is a diagram showing a utilization image in a case where second authentication processing based on an authentication vein image and a registered vein image is performed.

FIG. 27 is a diagram showing a utilization image in a case where second authentication processing based on an authentication vein image and a registered vein image is performed. An enlarged view K3 is a diagram representing the detection device 20-6 provided on the surface of the manipulation unit 120 and a portion surrounding the detection device 20-6 in an enlarged manner, and the light guide plates 23-1 and 23-2 that diffuse infrared light utilized for capturing a fingerprint image has been colored.

For example, since a vein image is difficult to leak out, and it is difficult in some cases to create, on the basis of a vein image, a finger having a vein similar to that vein, it is considered that the accuracy of authentication processing through use of a vein image is higher. However, the vein image is captured mainly in the state where a user is touching the image sensor with a portion between the first joint and the second joint as shown in FIG. 27, and thus may not be acquired easily. Therefore, the second condition for performing the second authentication processing based on the authentication vein image and the registered vein image may be a case where access to an application (for example, payment or the like) in which a high authentication accuracy is required is requested, or the like.

Subsequently, an example in which the first authentication processing based on the authentication fingerprint image and the registered fingerprint image and the second authentication processing based on the authentication vein image and the registered vein image are utilized together will be described. In such an example, the authentication processing unit 113B performs the first authentication processing and the second authentication processing together, and it is sufficient if the authentication processing unit 113B outputs the fact that authentication processing has succeeded (it is sufficient if the authentication processing unit 113B determines that authentication processing has succeeded) in a case where the first authentication processing has succeeded and the second authentication processing has succeeded. On the other hand, it is sufficient if the authentication processing unit 113B outputs the fact that authentication processing has failed (it is sufficient if the authentication processing unit 113B determines that authentication processing has failed) in a case where the first authentication processing has failed or the second authentication processing has failed.

Figure 28:
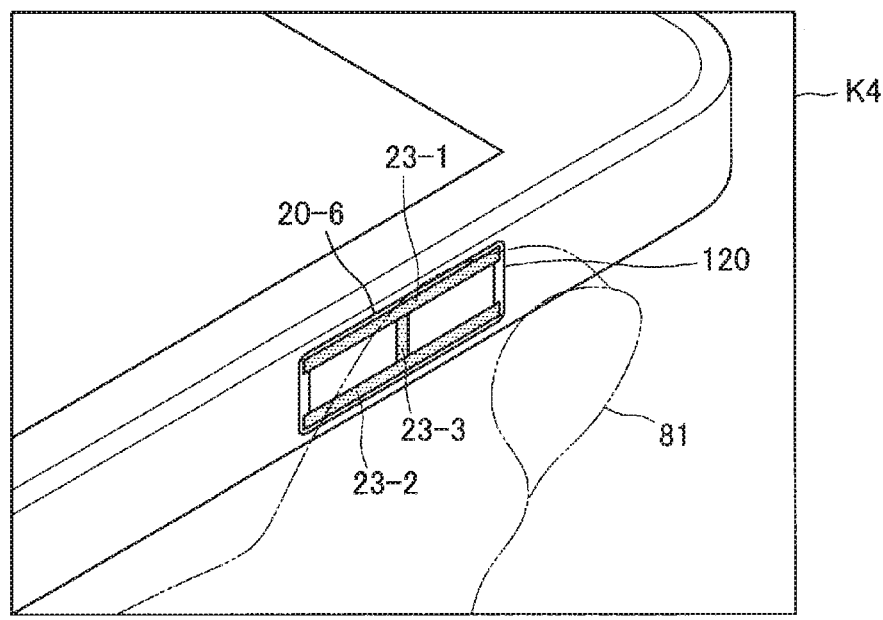
FIG. 28 is a diagram showing a utilization image in a case where both of the first authentication processing based on an authentication fingerprint image and a registered fingerprint image and the second authentication processing based on an authentication vein image and a registered vein image are performed.

FIG. 28 is a diagram showing a utilization image in a case where the first authentication processing based on the authentication fingerprint image and the registered fingerprint image and the second authentication processing based on the authentication vein image and the registered vein image are performed together. Here, a case where a fingerprint image and a vein image are captured together by a single contact on the detection device 20-6 with the fingertip is assumed. An enlarged view K4 is a diagram representing the detection device 20-6 provided on the surface of the manipulation unit 120 and a portion surrounding the detection device 20-6 in an enlarged manner, and the light guide plate 23-3 that diffuses visible light utilized for capturing a fingerprint image and the light guide plates 23-1, 23-2 that diffuse infrared light utilized for capturing a vein image have been colored.

Veins existing in the fingertip have smaller vessels and lower variability of patterns in some cases than veins existing in the portion between the first joint and the second joint. However, by utilizing the pattern of veins existing in the fingertip for authentication processing in addition to a fingerprint image, it is possible to increase the accuracy of authentication processing (for example, authentication processing to be performed in a case where cancellation of the locked state is requested) through use of a fingerprint image on the basis of a single contact on the detection device 20-6 with the fingertip.

The authentication processing has been described above. In addition, the second embodiment of the present disclosure has been described above.

3. Exemplary Hardware Configuration

Figure 29:
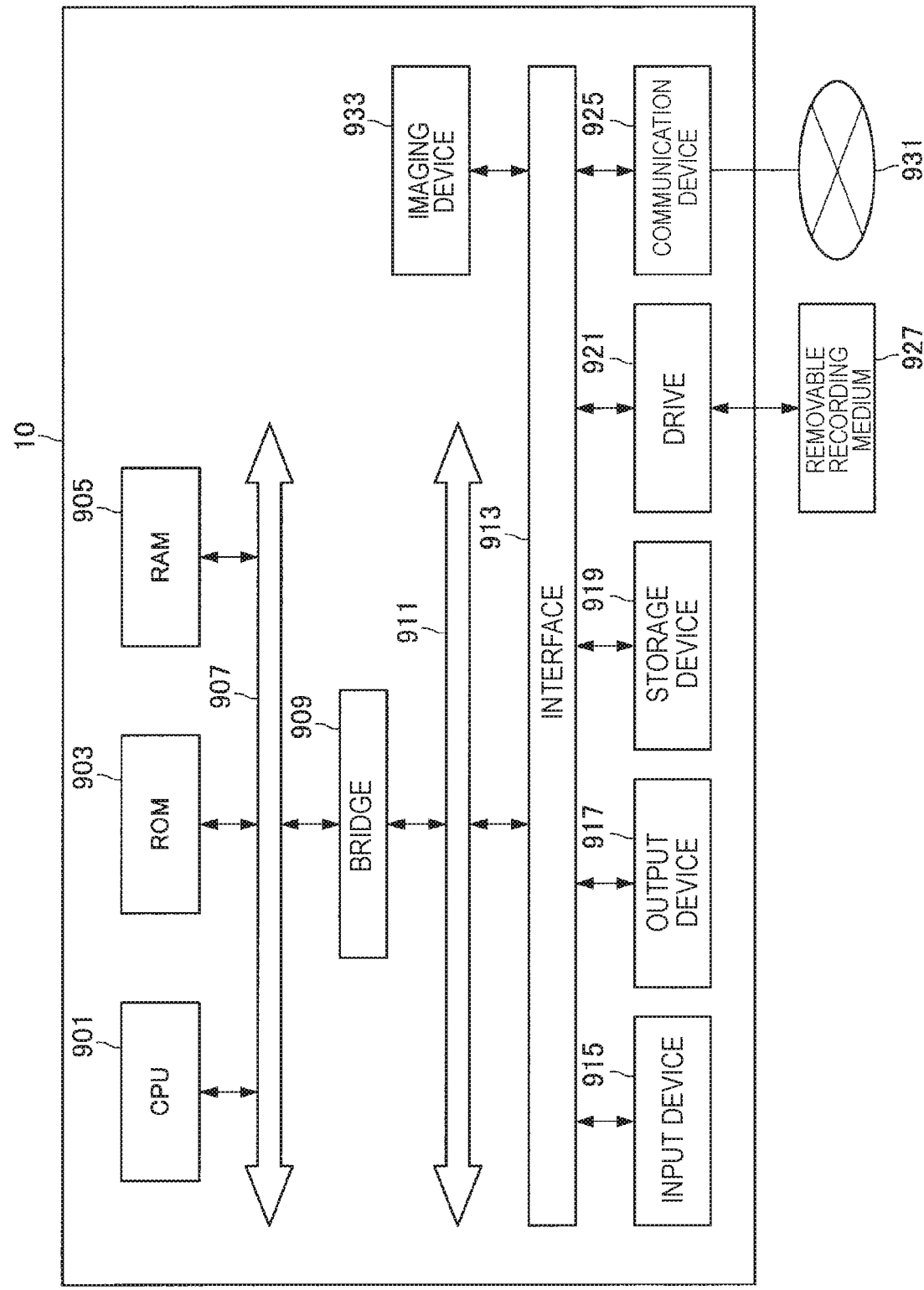
FIG. 29 is a block diagram showing an exemplary hardware configuration of an information processing device.

Next, with reference to FIG. 29, a hardware configuration of the information processing device 10 according to an embodiment of the present disclosure will be described. FIG. 29 is a block diagram showing an exemplary hardware configuration of the information processing device 10 according to an embodiment of the present disclosure.

As shown in FIG. 29, the information processing device 10 includes a central processing unit (CPU) 901, a read only memory (ROM) 903, and a random access memory (RAM) 905. In addition, the information processing device 10 may include a host bus 907, a bridge 909, an external bus 911, an interface 913, an input device 915, an output device 917, a storage device 919, a drive 921, and a communication device 925. Further, the information processing device 10 may include an imaging device 933. The information processing device 10 may have such a processing circuit called a digital signal processor (DSP) or an application specific integrated circuit (ASIC) instead of or in addition to the CPU 901.

The CPU 901 serves as an arithmetic processing device and a control device, and controls the overall operation or a part of the operation within the information processing device 10 according to various programs recorded in the ROM 903, the RAM 905, the storage device 919, or a removable recording medium 927. The ROM 903 stores programs, operation parameters, and the like used by the CPU 901. The RAM 905 temporarily stores programs that the CPU 901 uses and parameters and the like varying as appropriate during the execution of the programs. The CPU 901, the ROM 903, and the RAM 905 are connected with each other via the host bus 907 including an internal bus such as a CPU bus or the like. Further, the host bus 907 is connected to the external bus 911 such as a peripheral component interconnect/interface (PCI) bus via the bridge 909.

The input device 915 is a device manipulated by a user, such as a mouse, a keyboard, a touch panel, a button, a switch, and lever, for example. The input device 915 may include a microphone that detects voice of a user. The input device 915 may be a remote control device using, for example, infrared light or other radio waves, or may be an external connection device such as a mobile phone conforming to the manipulation of the information processing device 10. The input device 915 includes an input control circuit for generating an input signal on the basis of information input by a user, and outputting the input signal to the CPU 901. The user inputs various types of data to the information processing device 10 and instructs the information processing device 10 to perform a processing operation by manipulating this input device 915. In addition, the imaging device 933 which will be described later may also serve as an input device by imaging the movement of a user's hand, a user's finger, or the like. At this time, a pointing position may be determined in accordance with the hand movement or the finger orientation.

The output device 917 includes a device capable of visually or audibly notifying acquired information to a user. Examples of the output device 917 include display devices such as a liquid crystal display (LCD), a plasma display panel (PDP), an organic electro-luminescence (EL) display, and a projector, a hologram display device, audio output devices such as a speaker and a headphone, a printer device, and the like. The output device 917 outputs a result obtained by processing performed by the information processing device 10 as video of text or images, or as sound such as voice or acoustic. In addition, the output device 917 may include a light for lightning the surroundings.

The storage device 919 is a device for storing data configured as an example of a storage unit of the information processing device 10. The storage device 919 includes, for example, a magnetic storage unit device such as a hard disk drive (HDD), a semiconductor storage device, an optical storage device, or a magneto-optical storage device. This storage device 919 stores programs to be executed by the CPU 901, various types of data, and externally acquired various types of data, and the like.

The drive 921 is a reader/writer for the removable recording medium 927 such as a magnetic disk, an optical disk, a magneto-optical disk, or a semiconductor memory, and is embedded in or attached externally to the information processing device 10. The drive 921 reads information recorded in the attached removable recording medium 927 for output to the RAM 905. In addition, the drive 921 writes record in the attached removable recording medium 927.

The communication device 925 is a communication interface including, for example, a communication device for connecting to a communication network 931, or the like. The communication device 925 may be, for example, a wired or wireless local area network (LAN), Bluetooth (registered trademark), a communication card for wireless USB (WUSB), or the like. Alternatively, the communication device 925 may be a router for optical communication, a router for asymmetric digital subscriber line (ADSL), a modem for various communications, or the like. The communication device 925 transmits/receives signals and the like using a predetermined protocol such as TCP/IP on the Internet and to/from other communication devices, for example. In addition, the communication network 931 connected to the communication device 925 is a network connected via a wire or wirelessly, and is, for example, the Internet, a home LAN, infrared communication, radio wave communication, satellite communication, or the like.

The imaging device 933 is, for example, an image sensor such as a charge coupled device (CCD) or a complementary metal oxide semiconductor (CMOS), and a device that images real space using various members such as a lens for controlling forming of a subject image on the image sensor to generate a captured image. The imaging device 933 may be a device that captures a still image, or may be a device that captures a moving image.

4. Conclusion

As described above, according to an embodiment of the present disclosure, the detection device 20A for biometric authentication including the image sensor unit (first image sensor unit) 21-1 and the image sensor unit (second image sensor unit) 21-2 arranged on the same plane as the image sensor unit (first image sensor unit) 21-1 is provided. According to such a configuration, it is possible to sufficiently ensure the area of the image sensors as a whole, and to improve the accuracy of biometric authentication.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, if the operation of the information processing device 10 described above is achieved, the position of each component is not particularly limited. As a specific example, a part or the whole of the respective blocks (a registration image generation unit 112 and the authentication processing unit 113) that a control unit 110 has may exist in a server or the like. At that time, the above-described authentication processing may be performed when logging in a Web application of the server.

In addition, it is also possible to generate a program for causing hardware such as a CPU, a ROM, and a RAM built in a computer to exert a function equivalent to the function that the above-described control unit 110 has. In addition, a computer-readable recording medium having the program recorded thereon may also be offered.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A detection device for biometric authentication, including:

a first image sensor unit; and a second image sensor unit arranged on a same plane as the first image sensor unit.

(2)

The detection device according to (1), in which the second image sensor unit is arranged in a longitudinal direction of the first image sensor unit relative to the first image sensor unit.

(3)

The detection device according to (1), including:

a lighting between the first image sensor unit and the second image sensor unit.

(4)

The detection device according to (3), in which the lighting is arranged away from the first image sensor unit, and is arranged away from the second image sensor unit.

(5)

The detection device according to any one of (1) to (4), including:

an operation control unit configured to operate the first image sensor unit and the second image sensor unit alternately.

(6)

The detection device according to (5), including:

a first lighting whose distance from the second image sensor unit is shorter than a distance from the first image sensor unit; and a second lighting whose distance from the first image sensor unit is shorter than a distance from the second image sensor unit, in which the operation control unit turns on the first lighting and turns off the second lighting while the first image sensor unit is being operated, and turns on the second lighting and turns off the first lighting while the second image sensor unit is being operated.

(7)

The detection device according to (1), including:

a first lens group and a second lens group having a focal length different from a focal length of the first lens group, in which the first image sensor unit and the second image sensor unit have a first light receiving element group configured to detect light of a first wavelength range transmitted through the first lens group and a second light receiving element group configured to detect light of a second wavelength range transmitted through the second lens group.

(8)

An information processing device for biometric authentication, including:

a registration image generation unit configured to generate a registration image to be compared with an authentication image on the basis of a plurality of first detection images detected by a first image sensor unit and a plurality of second detection images detected by a second image sensor unit arranged on a same plane as the first image sensor unit.

(9)

The information processing device according to (8), in which the registration image generation unit generates a first composite image on the basis of the plurality of first detection images, and generates a second composite image on the basis of the plurality of second detection images, and generates the registration image on the basis of the first composite image and the second composite image.

(10)

The information processing device according to (9), in which the registration image generation unit determines a positional relationship between two images detected by the first image sensor unit and the second image sensor unit at corresponding timings, and generates the registration image on the basis of the positional relationship between the two images, the first composite image, and the second composite image.

(11)

The information processing device according to (9), in which the registration image generation unit determines the positional relationship between the two images on the basis of detection images detected by the first image sensor unit and the second image sensor unit, respectively, at corresponding timings and a detection image detected by either the first image sensor unit or the second image sensor unit.

(12)

The information processing device according to (8), in which the registration image generation unit acquires a positional relationship between two images detected by the first image sensor unit and the second image sensor unit at corresponding timings, and generates the registration image on the basis of the positional relationship between the two images, the plurality of first detection images, and the plurality of second detection images.

(13)

The information processing device according to (12), in which the registration image generation unit corrects the positional relationship between the two images, and generates the registration image on the basis of the positional relationship between two images after correction, the plurality of first detection images, and the plurality of second detection images.

(14)

The information processing device according to (9), in which the registration image generation unit corrects the positional relationship between two images on the basis of detection images detected by the first image sensor unit and the second image sensor unit, respectively, at corresponding timings and a detection image detected by either the first image sensor unit or the second image sensor unit.

(15)

The information processing device according to any one of (8) to (14), including:

an authentication processing unit configured to perform authentication processing on the basis of a third detection image detected by the first image sensor unit, a fourth detection image detected by the second image sensor unit, and the registration image.

(16)

The information processing device according to (8), in which the first image sensor unit and the second image sensor unit have a first light receiving element group configured to detect light of a first wavelength range and a second light receiving element group configured to detect light of a second wavelength range, and the registration image generation unit generates a first registration image to be compared with a first authentication image on the basis of a first detection result of light transmitted through the first lens group obtained by the first light receiving element group, and generates a second registration image to be compared with a second authentication image on the basis of a second detection result of light transmitted through a second lens group obtained by the second light receiving element group, the second lens group having a focal length different from a focal length of the first lens group.

(17)

The information processing device according to (16), including:

an authentication processing unit capable of performing first authentication processing based on a third detection result obtained by the first light receiving element group and the first registration image, and capable of performing second authentication processing based on a fourth detection result obtained by the second light receiving element group and the second registration image.

(18)

The information processing device according to (17), in which the authentication processing unit performs the first authentication processing in a case where a predetermined first condition is met, and performs the second authentication processing in a case where a predetermined second condition is met.

(19)

The information processing device according to (17), in which the authentication processing unit outputs a fact that authentication processing has succeeded in a case where the first authentication processing has succeeded and the second authentication processing has succeeded.

(20)

An information processing method for biometric authentication, including, by a processor:

generating a registration image to be compared with an authentication image on the basis of a plurality of first detection images detected by a first image sensor unit and a plurality of second detection images detected by a second image sensor unit arranged on a same plane as the first image sensor unit.

REFERENCE SIGNS LIST 10 (10A, 10B) information processing device
110 (110A, 110B) control unit
112 (112A, 112B) registration image generation unit
113 (113A, 113B) authentication processing unit
120 manipulation unit
130 input unit
150 storage unit
160 output unit
20 (20A, 20B) detection device
21 image sensor unit
22 lighting
23 light guide plate
24 operation control unit
lens array
251 first lens group
252 second lens group
26 lighting
31 first detection image
32 second detection image
33 first composite image
34 second composite image
overlapping region
registration image
51 third detection image
52 fourth detection image

The invention claimed is:

1. An information processing device for biometric authentication, comprising:
   circuitry configured to
       generate a registration image to be compared with an authentication image on a basis of a plurality of first detection images detected by a first image sensor unit and a plurality of second detection images detected by a second image sensor unit arranged on a same plane as the first image sensor unit,
   wherein the first image sensor unit and the second image sensor unit are disposed on a power on/off button of the information processing device,
   wherein the first image sensor unit comprises a first light receiving element configured to detect light of a first wavelength range, the second image sensor unit comprises a second light receiving element configured to detect light of a second wavelength range, and
   wherein the first wavelength range is different from the second wavelength range,
   comprising a first light receiving element group configured to detect light of a first wavelength range and a second light receiving element group configured to detect light of a second wavelength range.

2. The information processing device according to claim 1, wherein the circuitry is further configured to generate a first composite image on a basis of the plurality of first detection images, and to generate a second composite image on a basis of the plurality of second detection images, and to generate the registration image on a basis of the first composite image and the second composite image.

3. The information processing device according to claim 2, wherein the circuitry is further configured to determine a positional relationship between two images detected by the first image sensor unit and the second image sensor unit at corresponding timings, and to generate the registration image on a basis of the positional relationship between the two images, the first composite image, and the second composite image.

4. The information processing device according to claim 3, wherein the circuitry is further configured to determine the positional relationship between the two images on a basis of detection images detected by the first image sensor unit and the second image sensor unit, respectively, at corresponding timings and a detection image detected by either the first image sensor unit or the second image sensor unit.

5. The information processing device according to claim 3, wherein the circuitry is further configured to correct the positional relationship between two images on a basis of detection images detected by the first image sensor unit and the second image sensor unit, respectively, at corresponding timings and a detection image detected by either the first image sensor unit or the second image sensor unit.

6. The information processing device according to claim 1, wherein the circuitry is further configured to acquire a positional relationship between two images detected by the first image sensor unit and the second image sensor unit at corresponding timings, and generates the registration image on a basis of the positional relationship between the two images, the plurality of first detection images, and the plurality of second detection images.

7. The information processing device according to claim 6, wherein the circuitry is further configured to correct the positional relationship between the two images, and to generate the registration image on a basis of the positional relationship between two images after correction, the plurality of first detection images, and the plurality of second detection images.

8. The information processing device according to claim 1, wherein the circuitry is further configured to perform authentication processing on a basis of a third detection image detected by the first image sensor unit, a fourth detection image detected by the second image sensor unit, and the registration image.

9. An information processing device comprising:
a first image sensor unit and a second image sensor unit comprising a first light receiving element group configured to detect light of a first wavelength range and a second light receiving element group configured to detect light of a second wavelength range, and
circuitry configured to generate a first registration image to be compared with a first authentication image on a basis of a first detection result of light transmitted through a first lens group obtained by the first light receiving element group, and to generate a second registration image to be compared with a second authentication image on a basis of a second detection result of light transmitted through a second lens group obtained by the second light receiving element group, the second lens group having a focal length different from a focal length of the first lens group.

10. The information processing device according to claim 9, wherein the circuitry is further configured to perform first authentication processing based on a third detection result obtained by the first light receiving element group and the first registration image, and to perform second authentication processing based on a fourth detection result obtained by the second light receiving element group and the second registration image.

11. The information processing device according to claim 10, wherein the circuitry is further configured to perform the first authentication processing in a case where a predetermined first condition is met, and to perform the second authentication processing in a case where a predetermined second condition is met.

12. The information processing device according to claim 10, wherein the circuitry is further configured to output a fact that authentication processing has succeeded in a case where the first authentication processing has succeeded and the second authentication processing has succeeded.

13. An information processing method for biometric authentication, comprising, by a processor:
generating a registration image to be compared with an authentication image on a basis of a plurality of first detection images detected by a first image sensor unit and a plurality of second detection images detected by a second image sensor unit arranged on a same plane as the first image sensor unit,
wherein the first image sensor unit and the second image sensor unit are disposed on a power on/off button of the information processing device,
wherein the first image sensor unit comprises a first light receiving element configured to detect light of a first wavelength range, the second image sensor unit comprises a second light receiving element configured to detect light of a second wavelength range, and
wherein the first wavelength range is different from the second wavelength range.

* * * * *